United States Patent
Kameyama et al.

(10) Patent No.: US 10,459,813 B2
(45) Date of Patent: Oct. 29, 2019

(54) SYSTEM AND DEVICE FOR SYNCHRONIZING DATA IN A PLURALITY OF DEVICES

(71) Applicant: FUJITSU LIMITED, Kawasaki-shi, Kanagawa (JP)

(72) Inventors: Shinichi Kameyama, Iwakura (JP); Takashi Kawada, Yokohama (JP); Ryoko Masuda, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 15/795,456

(22) Filed: Oct. 27, 2017

(65) Prior Publication Data

US 2018/0121305 A1    May 3, 2018

(30) Foreign Application Priority Data

Nov. 1, 2016  (JP) .................. 2016-214185

(51) Int. Cl.
| | | |
|---|---|---|
| G06F 11/20 | (2006.01) | |
| G06F 16/27 | (2019.01) | |
| G06F 3/06 | (2006.01) | |
| G06F 11/16 | (2006.01) | |
| G06F 16/13 | (2019.01) | |

(52) U.S. Cl.
CPC ........ *G06F 11/2094* (2013.01); *G06F 3/0604* (2013.01); *G06F 3/065* (2013.01); *G06F 3/0617* (2013.01); *G06F 3/0683* (2013.01); *G06F 11/1666* (2013.01); *G06F 16/13* (2019.01); *G06F 16/275* (2019.01); *G06F 2201/85* (2013.01)

(58) Field of Classification Search
CPC ..... G06F 11/20; G06F 11/2094; G06F 16/275
See application file for complete search history.

(56) References Cited

U.S. PATENT DOCUMENTS

| | | | | |
|---|---|---|---|---|
| 6,691,245 B1* | 2/2004 | DeKoning | .......... | G06F 11/2028 714/15 |
| 7,185,228 B2* | 2/2007 | Achiwa | ............... | G06F 11/2058 707/999.202 |
| 7,370,099 B2* | 5/2008 | Hara | ....................... | G06F 11/20 709/223 |
| 9,069,834 B2* | 6/2015 | Maeda | ................ | G06F 11/2082 |
| 9,075,772 B2* | 7/2015 | Kawada | ............... | G06F 11/1456 |
| 9,842,117 B1* | 12/2017 | Zhou | ..................... | G06F 16/128 |

(Continued)

FOREIGN PATENT DOCUMENTS

| | | |
|---|---|---|
| JP | 2005-182222 | 7/2005 |
| JP | 2007-264946 | 10/2007 |

*Primary Examiner* — Kamini B Patel
(74) *Attorney, Agent, or Firm* — Xsensus LLP

(57) ABSTRACT

A storage device including a first memory that stores a plurality of pieces of data a second memory that stores first state information indicating a state of update of the plurality of pieces of data, and a processor coupled to the first memory and the second memory and the processor configured to receive a update request for the plurality of pieces of data stored in the first memory, update a part of the plurality of pieces of data corresponding to the update request in response to an update of a second storage device coupled to the storage device, and update the first state information in response to the update of the plurality of pieces of data.

4 Claims, 20 Drawing Sheets

(56) References Cited

U.S. PATENT DOCUMENTS

2005/0138308 A1* 6/2005 Morishita ............... G06F 3/061
  711/162
2007/0233981 A1* 10/2007 Arakawa ............. G06F 11/2064
  711/162
2011/0246599 A1* 10/2011 Kawada .................. G06F 16/27
  709/212

* cited by examiner

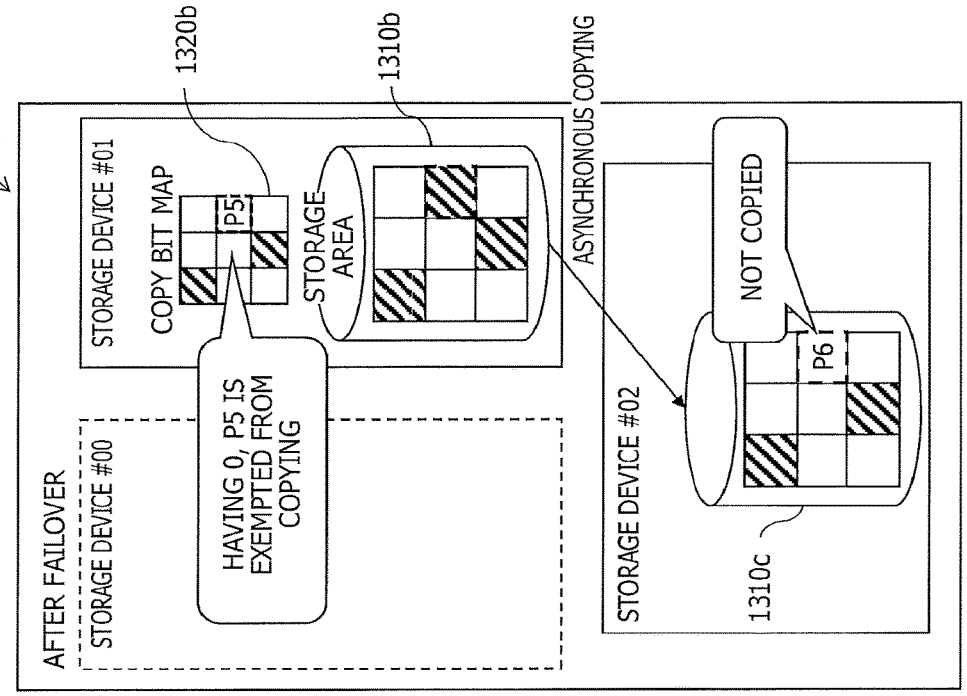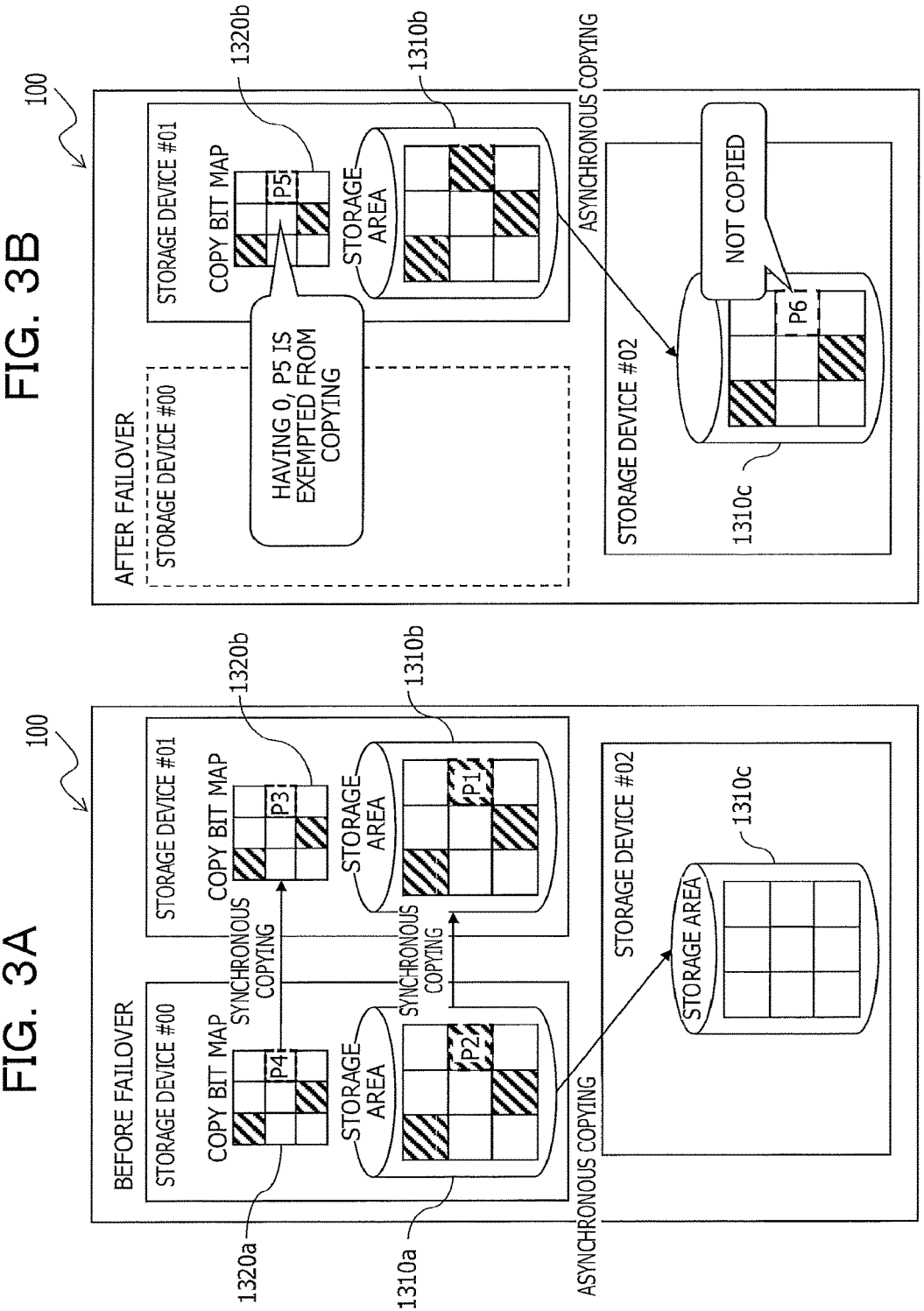

| DEVICE PAIR ID | PRIMARY DEVICE ID | SECONDARY DEVICE ID | ACTIVE DEVICE ID |
|---|---|---|---|
| 0 | 0000 | 0001 | 0000 |

FIG. 10

| VOLUME ID | LUN | DEVICE ID | BLOCK SIZE |
|---|---|---|---|
| 0 | 0 | 0000 | 39062 |
| 1 | 2 | 0001 | 39062 |
| 2 | 1 | 0002 | 39062 |

FIG. 12A

STORAGE DEVICE #0 (DEVICE ID:0000) — 305

GROUP MANAGEMENT TABLE

| | |
|---|---|
| GROUP ID | 0 |
| USAGE STATUS | PRIMARY |
| OPERATION STATES | ACTIVE |
| COUNTERPART DEVICE ID | 0001 |
| LUN | 0 |
| REMOTE DEVICE ID | 0002 |

COPY MANAGEMENT TABLE — 306

| | |
|---|---|
| SESSION ID | 0 |
| COPY SOURCE LUN | 0 |
| COPY DESTINATION LUN | 2 |
| SESSION ID | 1 |
| COPY BIT MAP | 000000… |
| COPY SOURCE LUN | 0 |
| COPY DESTINATION LUN | 1 |

FIG. 12B

STORAGE DEVICE #1 (DEVICE ID:0001) — 305

GROUP MANAGEMENT TABLE

| | |
|---|---|
| GROUP ID | 0 |
| USAGE STATUS | SECONDARY |
| OPERATION STATES | STANDBY |
| COUNTERPART DEVICE ID | 0000 |
| LUN | 2 |
| REMOTE DEVICE ID | 0002 |

COPY MANAGEMENT TABLE — 306

| | |
|---|---|
| SESSION ID | 0 |
| COPY SOURCE LUN | 2 |
| COPY DESTINATION LUN | 0 |
| SESSION ID | 1 |
| COPY BIT MAP | 000000… |
| COPY SOURCE LUN | 2 |
| COPY DESTINATION LUN | 1 |

SYNCHRONIZATION

FIG. 13

| GROUP MANAGEMENT TABLE | |
|---|---|
| GROUP ID | 0 |
| USAGE STATUS | PRIMARY |
| OPERATION STATES | ACTIVE |
| COUNTERPART DEVICE ID | |
| LUN | 0000,0001 |
| REMOTE DEVICE ID | 1 |

305

| COPY MANAGEMENT TABLE | |
|---|---|
| SESSION ID | 0 |
| COPY SOURCE LUN | 0 |
| COPY DESTINATION LUN | 1 |
| SESSION ID | 1 |
| COPY SOURCE LUN | 2 |
| COPY DESTINATION LUN | 1 |

306

SYSTEM AND DEVICE FOR SYNCHRONIZING DATA IN A PLURALITY OF DEVICES

CROSS-REFERENCE TO RELATED APPLICATION

This application is based upon and claims the benefit of priority of the prior Japanese Patent Application No. 2016-214185, filed on Nov. 1, 2016, the entire contents of which are incorporated herein by reference.

FIELD

The embodiment discussed herein is related to a storage system and a storage device.

BACKGROUND

There has been known a technique of clustering multiple storage devices such that even when one of the clustered storage devices stops due to a failure or the like, another storage device having been in a standby state may be used to continue operation.

For example, for a storage system operated with two storage devices clustered, there has been an approach in which: data in storage areas as access targets from a host device is copied to storage areas of the storage device in a standby state to synchronize the respective storage areas; and then if the storage device in an operation state stops, the host device is allowed to continue task processing by changing the access targets of the host device to the storage areas of the other storage device.

Furthermore, there has been known a technique of not only copying data in a storage area of one storage device into a storage area of a first different storage device but also further copying the data of the storage area at a copy location in the first different storage device to a storage area of a second different storage device located in a remote place.

FIG. 20 is a diagram illustrating a configuration of a conventional storage system.

A conventional storage system 500 illustrated in FIG. 20 includes a first storage device 501, a second storage device 502, and a remote storage device 503.

The first storage device 501 and the second storage device 502 are clustered. A storage area 501a of the first storage device 501 is synchronized with a storage area 502a of the second storage device 502, and data in the storage area 501a of the first storage device 501 is copied (synchronously copied) to the storage area 502a of the second storage device 502.

For example, when a host device, which is not illustrated, performs writing to the storage area 501a of the first storage device 501, copying is performed to synchronize the storage area 501a of the first storage device 501 to the storage area 502a of the second storage device 502.

In addition, data in the storage area 501a of the first storage device 501 is asynchronously copied to a storage area 503a of the remote storage device 503. For example, if writing is performed on the storage area 501a of the first storage device 501, the data in the storage area 501a of the first storage device 501 is copied to the storage area 503a of the remote storage device 503, at a timing when there is no access to both the first storage device 501 and the remote storage device 503.

The related art has been disclosed in Japanese Laid-open Patent Publication Nos. 2007-264946 and 2005-182222, for example.

SUMMARY

According to an aspect of the invention, a storage system comprising a first storage device including a first memory that stores a plurality of pieces of data; a second memory that stores first state information indicating a state of update of the plurality of pieces of data, and a first processor coupled to the first memory and the second memory, a second storage device including: a third memory that stores a plurality of pieces of first copied data that is a copy of the plurality of pieces of data, a fourth memory that stores second state information indicating a state of update of the plurality of pieces of first copied data, and a second processor coupled to the third memory and the fourth memory, and a third storage device including a fifth memory that stores a plurality of pieces of second copied data that is a copy of the plurality of pieces of data, wherein the first processor is configured to receive a update request for the plurality of pieces of data stored in the first memory, the second processor is configured to update a part of the plurality of pieces of first copied data corresponding to the update request, update the second state information in response to an update of the plurality of pieces of first copied data, wherein the first processor is further configured to update a part of the plurality of pieces of data corresponding to the update request in response to an update of the second state information, update the first state information in response to an update of the plurality of pieces of data, transmit the plurality of pieces of updated data to the third storage device in response to an update of the first state information, update the first state information in response to a transmission of the plurality of pieces of updated data, and wherein the second processor is further configured to: when the first storage device stops, transmit the plurality of pieces of updated first copied data to the third storage device, the plurality of pieces of updated first copied data being specified based on the second state information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams for describing a problem related to the storage system;

FIG. 9 is a diagram illustrating a device information table in the storage system as the example of the embodiment;

FIG. 10 is a diagram illustrating a volume management table in the storage system as the example of the embodiment;

FIGS. 12A and 12B are a diagram illustrating a group management table and a copy management table of the storage device of the storage system as the example of the embodiment;

FIG. 13 is a diagram illustrating the group management table and the copy management table of the storage device;

DESCRIPTION OF EMBODIMENT

Figure 1:
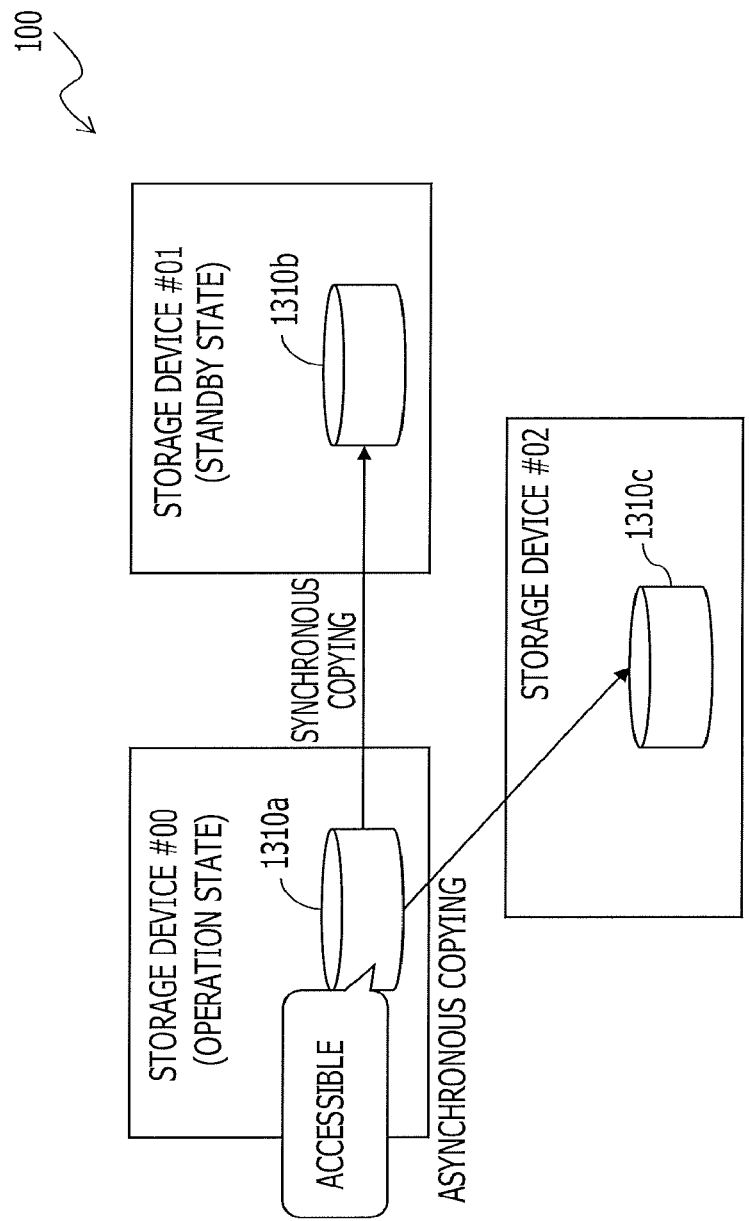
FIG. 1 is a diagram illustrating copy processing when a storage system is in operation.

In such a conventional storage system 500, when a first storage device 501 stops, access from a host device is switched from a storage area 501a of the first storage device 501 to a storage area 502a of a second storage device 502. Such automatic switching to a redundant standby system in case of the occurrence of any failure is referred to as failover.

In that case, however, remote copying performed from the first storage device 501 to a remote storage device 503 is interrupted.

To address this, a system administrator (storage manager) or the like performs processing (a1) to (a3) as described below, so that copying is performed from the storage area 502a of the second storage device 502 to a storage area 503a of the remote storage device 503.

(a1) Stop copying from the first storage device 501 to the remote storage device 503.

(a2) Set a copy pair of the second storage device 502 and the remote storage device 503.

(a3) Start copying (remote copying) from the second storage device 502 to the remote storage device 503.

In the conventional storage system 500, however, remote copying from the second storage device 502 to the remote storage device 503 is performed from the beginning of the storage area 502a irrespective of how much the remote copying from the first storage device 501 to the remote storage device 503 has been completed. This leads to a problem that remote copying to the storage area 503a consumes time.

One of the objectives of the present disclosure is to efficiently perform remote copying performed asynchronously.

(I) Related Art

Figure 2:
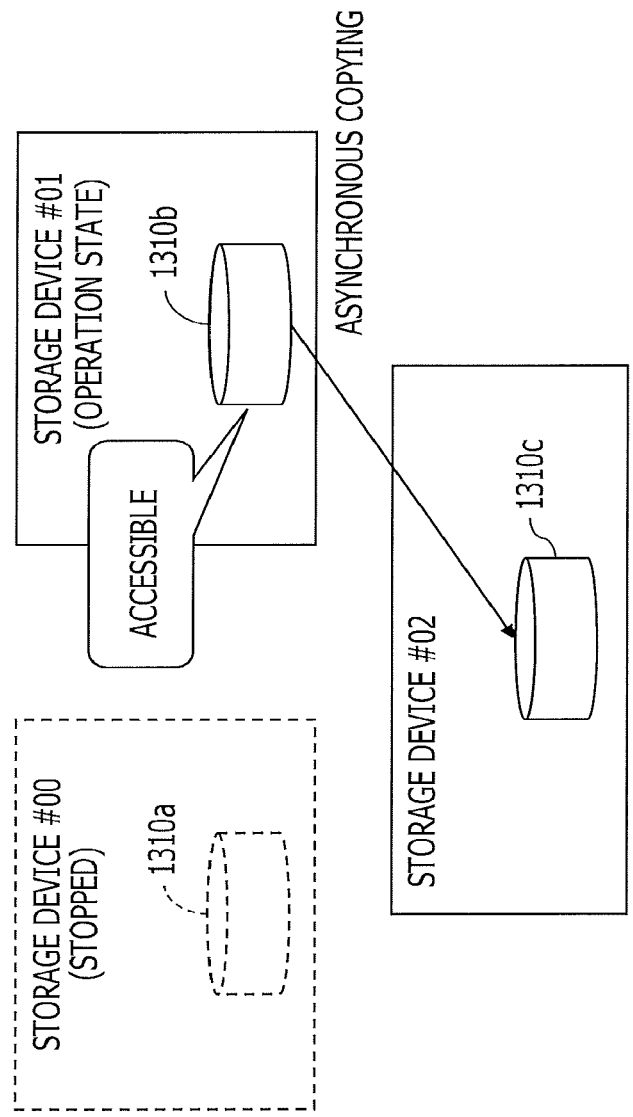
FIG. 2 is a diagram illustrating the copy processing when a failure occurs in the storage system.

FIG. 1 is a diagram illustrating copy processing when a storage system 100 is in operation. FIG. 2 is a diagram illustrating the copy processing when a failure occurs in the storage system.

A storage system 100 illustratively illustrated in FIG. 1 includes three storage devices #00, #01, and #02.

The storage device #00 and the storage device #01 are clustered (storage cluster). In an operation state, the storage device #00 that is used as a master performs synchronous copying that duplicates data in a storage area 1310a in the storage device #00 to be accessed by a host device, which is not illustrated, to a storage area 1310b of the storage device #01 that is used as a slave. In the following, copying (duplication) of data in a storage area may be also simply referred to as copying a storage area, for convenience.

With this synchronous copying, the data in the storage area 1310a of the storage device #00 and the data in the storage area 1310b of the storage device #01 are synchronized and consistent with each other. In other words, the data in the storage area 1310a of the storage device #00 is made redundant by the storage area 1310b of the storage device #01.

When the storage device #00, which is the master, is in the operation state, the storage device #01, which is the slave, is in the standby state.

In addition, the data in the storage area 1310a of the storage device #00 is copied asynchronously (asynchronous copying) to a storage area 1310c of the storage device #02 located in a place (remote place) geographically remote from the storage devices #00, #01.

In asynchronous copying, the storage device #02 receives a write request of copy data (write data), for example, from the storage device #00 and transmits a completion acknowledgment of this write to the storage device #00, at the timing when storage of the write data into a cache memory (illustration omitted) included in the storage device #02 itself is completed. Then, through background processing, the storage device #02 writes the data into the storage area 1310c allocated to a storage unit in the storage device #02 when appropriate.

The storage device #02 located in a remote place from the storage devices #00, #01, for example, in a different region or country, the data in the storage area 1310a of the storage device #00 may be protected even if the storage devices #00, #01 are hit by an earthquake or the like.

As illustrated in FIG. 2, when the storage device #00 stops due to a failure or the like, failover for access from the host device is performed from the storage area 1310a of the storage device #00 to the storage area 1310b of the storage device #01.

In a possible operation at the failover, the storage device #01 first causes the storage device #02 to stop asynchronous copying from the storage device #00, and then resumes the asynchronous copying from the storage area 1310b to the storage area 1310c of the storage device #02 by using a copy bit map synchronously copied from the storage device #00.

In such a case, however, data loss in the asynchronous copying from the storage device #01 to the storage device #02 may occur depending on the timing when the failover occurs.

FIGS. 3A and 3B are diagrams for describing a problem related to the storage system 100.

FIGS. 3A and 3B illustrate an example in which the storage system 100 performs synchronous copying to synchronize the data storage states of a copy bit map 1320a and the storage area 1310a of the storage device #00 with those of a copy bit map 1320b and the storage area 1310b of the storage device #01, respectively.

FIG. 3A depicts a state before failover, and FIG. 3B depicts a state after the storage device #00 stops and failover to the storage device #01 is conducted.

As depicted in FIG. 3A, before the failover, the storage area 1310b of the storage device #01 is first updated (see symbol P1 in FIG. 3A), and then the storage area 1310a of the storage device #00 is updated (see symbol 2 in FIG. 3A). Then, the copy bit map 1320b of the storage device #01 is updated (see symbol P3 in FIG. 3A), and thereafter the copy bit map 1320a of the storage device #00 is updated (see symbol P4 in FIG. 3A).

Here, consider a case where the storage device #00 stops and failover to the storage device #01 occurs when updating of the storage areas 1310b, 1310a is completed and updating of the copy bit map 1320b, 1320a is not yet performed. In this case, the updating in the storage areas 1310b, 1310a is not reflected in the copy bit map 1320b in the storage device #01 (see symbol P5 in FIG. 3B). More specifically, the copy bit map 1320b is inconsistent with the data storage state of the storage areas 1310b, 1310a.

Therefore, as depicted in the FIG. 3B, if the storage device #01 takes over the remote copying to the storage device #02 according to the copy bit map 1320b after the failover, some storage area (see symbol P6 in FIG. 3B) exempted from the remote copying is generated in the storage device #02. In other words, the storage area 1310c of the storage device #02 at a remote copy destination is inconsistent with the data storage states of the storage areas 1310a, 1310b of the storage devices #00, #01 at remote copying sources.

(II) Description of Embodiment

An embodiment according to a storage system and storage device are described hereinafter with reference to the drawings. Note, however, that the embodiment described below is simply illustrative and is not intended to exclude various variations or application of techniques that are not demonstrated herein. More specifically, this embodiment may be varied and implemented to the extent that a variation does not depart from the intent of the embodiment. In addition, each figure is not intended to include only components that are illustrated in the figure and may include other function or the like.

(A) Configuration

Figure 4:
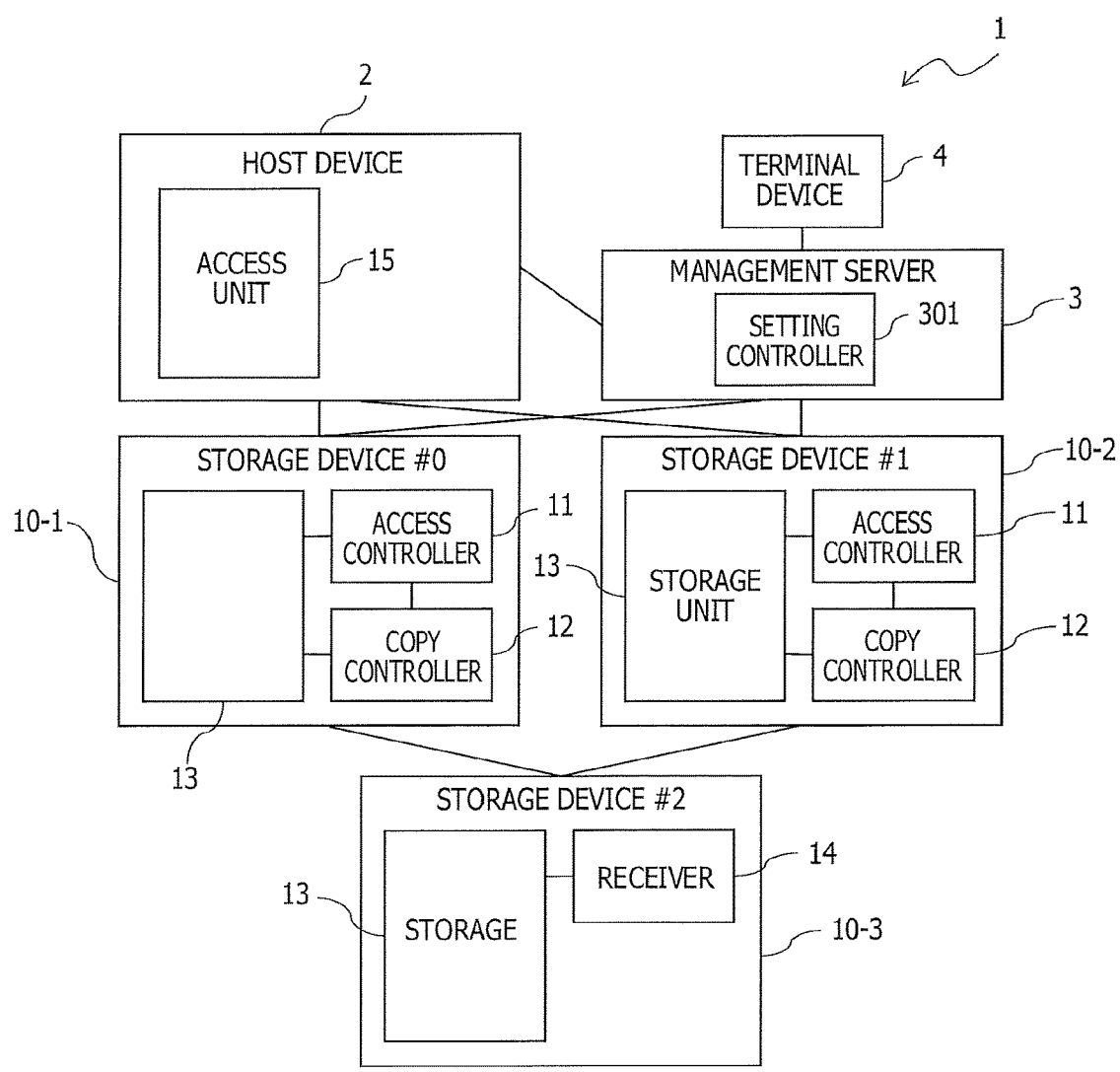
FIG. 4 is a diagram illustrating a functional configuration of a computer system as an example of an embodiment.

FIG. 4 is a diagram illustrating a functional configuration of a computer system as an example of the embodiment.

As illustrated in FIG. 4, a storage system 1 as an example of the embodiment includes a host device 2, a management server 3, a terminal device 4, and multiple (three in the example illustrated in FIG. 4) storage devices 10-1 to 10-3.

The host device 2 is connected to each of the storage devices 10-1, 10-2 as a high-order device.

The host device 2 is an information processor and is a computer, including a memory such as random access memory (RAM) or read only memory (ROM) or a central processing unit (CPU). In addition, the host device 2 includes an adaptor, which is not illustrated. This adaptor is connected with adaptors 124 (see FIG. 6) included in the storage devices 10-1, 10-2, respectively, by way of a communication line.

The host device 2 writes or reads data to or from a storage area (volume) provided by the connected storage devices 10-1, 10-2. For example, the host device 2 makes a data access request (Input/output request: I/O request) such as read or write, to a copy source volume 131a (see FIG. 7), which is a service volume of the storage device 10-1. The storage device 10-1 performs data access to the copy source volume 131a in response to this data access request and responds to the host device 2.

Figure 6:
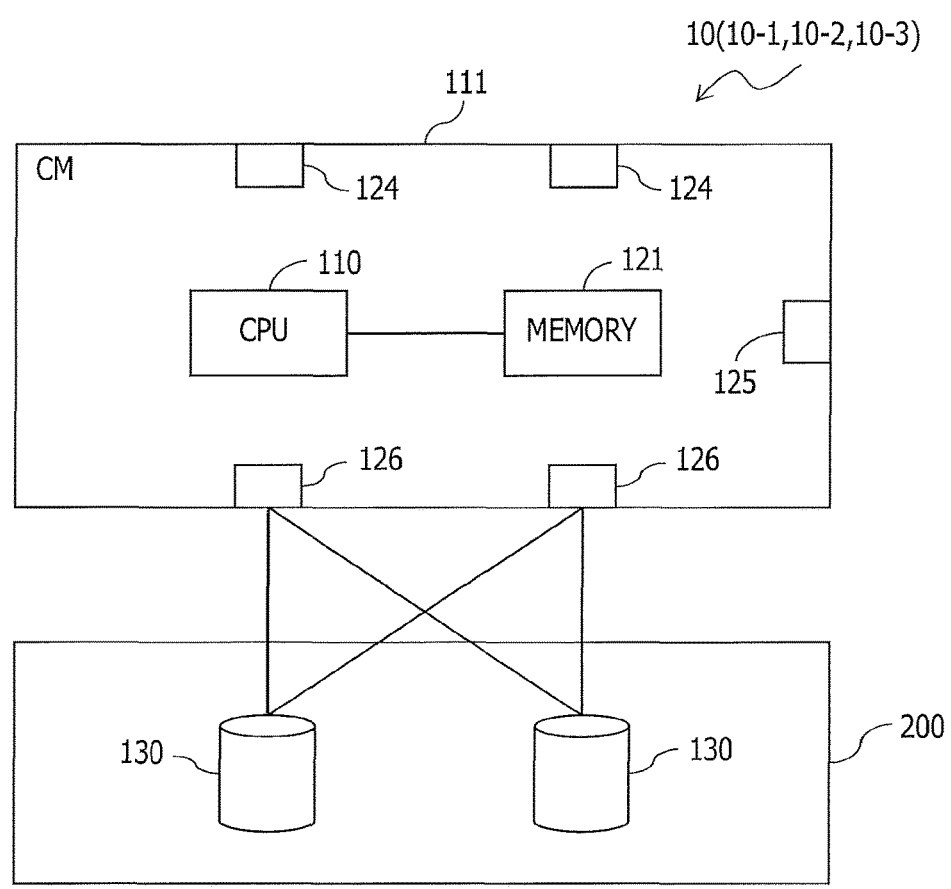
FIG. 6 is a diagram illustrating a hardware configuration of a storage device as an example of the embodiment.

The storage device 10-3 is connected with the storage devices 10-1, 10-2, respectively, by way of the communication line by the adaptor 124 (see FIG. 6).

The management server 3 controls copies of data in the storage devices 10-1 to 10-3.

Figure 5:
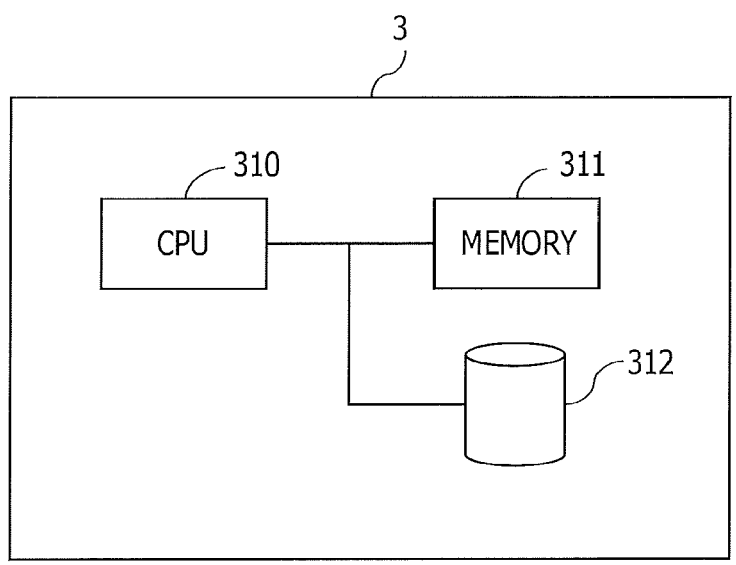
FIG. 5 is a diagram illustrating a hardware configuration of a management server in a storage system as an example of the embodiment.

FIG. 5 is a diagram illustrating a hardware configuration of the management server 3 in the storage system 1 as the example of the embodiment.

The management server 3 is a computer including server functions, and, as illustrated in FIG. 5, includes a CPU 310, a memory 311, and a storage unit 312.

The storage unit 312 is a storage unit such as a hard disk drive (HDD), a solid state drive (SDD), a storage class memory (SCM) or the like and is configured to store various types of data.

The memory 311 is a storage memory including a RAM and a ROM. In the ROM of the memory 311 are written a software program involved in copy control or data for this program or the like. The software program on the memory 311 is read into the CPU 310 and executed, when appropriate. In addition, the RAM of the memory 311 is used as a primary storage memory or a working memory.

Then, by the CPU 310 executing a copy control program, which is not illustrated, the management server 3 functions as a setting controller 301 (see FIG. 4) to be described below and controls copying of the data in the storage devices 10-1 to 10-3.

The terminal device 4 is an input/output device to perform operational input that an operator performs on the management server 3. The terminal device 4 includes, for example, an input device such as a keyboard or a mouse or the like and an output device such as a display or the like (illustration of any of which is omitted). The operational input performed by the operator using the terminal device 4 is inputted to the management server 3.

The storage device 10 provides the host device 2 with a storage area and is redundant arrays of inexpensive disks (RAID), for example.

The storage devices 10-1 to 10-3 include a similar configuration. Note that in the following, as a symbol representing a storage device, symbols 10-1, 10-2, and 10-3 are used when it is desirable to identify one of a plurality of storage devices, while symbol 10 is used to refer to any storage device.

In addition, in the following, the storage device 10-1 may be depicted as a storage device #0. Similarly, the storage device 10-2 may be depicted as a storage device #1 or the storage device 10-3 as a storage device #2, respectively.

FIG. 6 is a diagram illustrating a hardware configuration of the storage device 10 as an example of the embodiment.

As illustrated in FIG. 6, the storage device 10 includes a controller module (CM: storage control device) 111 and a device enclosure (DE) 200.

One or more (two in the example illustrated in FIG. 6) storage units (physical disks) 130 are mounted on the DE 200, and storage areas (real volumes, real storages) of these storage units 130 are provided to the storage device 10.

The storage unit 130 stores various types of data and is, for example, a HHD or an SSD, an SCM or the like.

In addition, some of the storage areas of the storage unit 130 are used as a copy bit map area.

Copy bit maps 132a, 132b (see FIG. 19) are stored in the copy bit map area. Hereinafter, a copy bit map included in the storage device 10-1 is represented by a symbol 132a and a copy bit map included in the storage device 10-2 is represented by a symbol 132b.

In addition, hereinafter, as a symbol to represent a copy bit map, symbols 132a, 132b are used when it is desirable to identify one of a plurality of copy bit maps, while symbol 132 is used to refer to any copy bit map.

Figure 7:
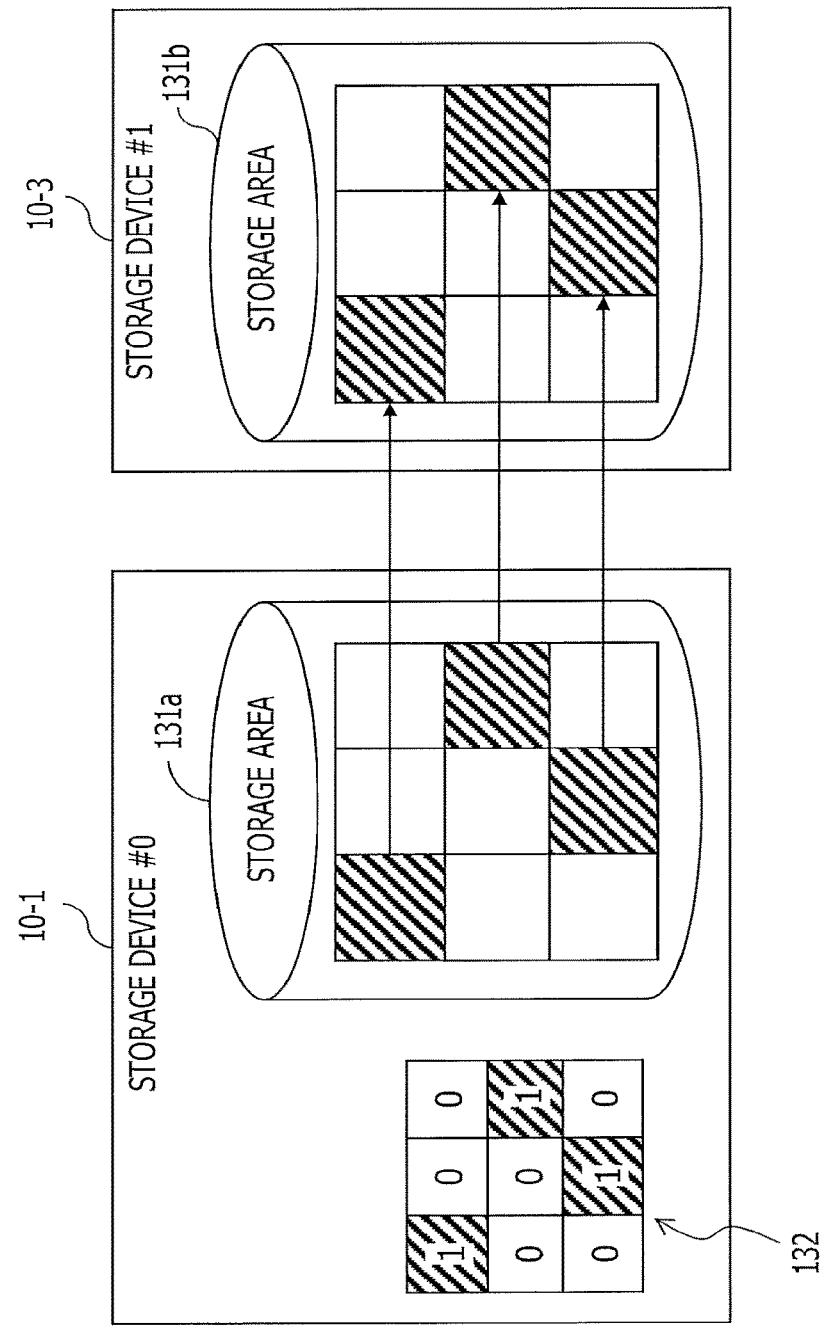
FIG. 7 is a diagram for describing a copy bit map.

FIG. 7 is a diagram for describing the copy bit map 132.

The copy bit map 132 is created by, for example, dividing the copy source volume 131 into multiple unit areas (unit time data) in predetermined size (8 KB, for example), and associating with each of these unit areas information indicating whether or not data stored in each unit area is transferred (copied) to a copy destination volume. More specifically, the copy bit map 132 is progress information (management information, first management information, second management information) that indicates progress of copying (asynchronous copying, writing) from the storage area 131 at the copy source to the storage area 131 at the copy destination.

In the copy bit map 132, information ("1", for example) indicating that copying, more specifically, writing of data is performed is set at a location where copying (remote copying) of data from the storage area 131 at the copy source to the storage area 131 at the copy destination is performed. In addition, information ("0", for example) indicating that copying is not performed is set at a location where no copying is performed.

For example, a copy controller 12 (see FIG. 4) of the storage device 10-1 to be described below uses the copy bit map 132a to manage a copying progress, copying result, or the like when performing remote copying through asynchronous copying from the copy source volume 131a to the copy destination volume 131c (see FIG. 8).

Similarly, a copy controller 12 (see FIG. 4) of the storage device 10-2 to be described below uses the copy bit map 132b to manage a copying progress, copying result, or the like when performing remote copying through coping from the copy source volume 131b to the copy destination volume 131c.

Figure 8:
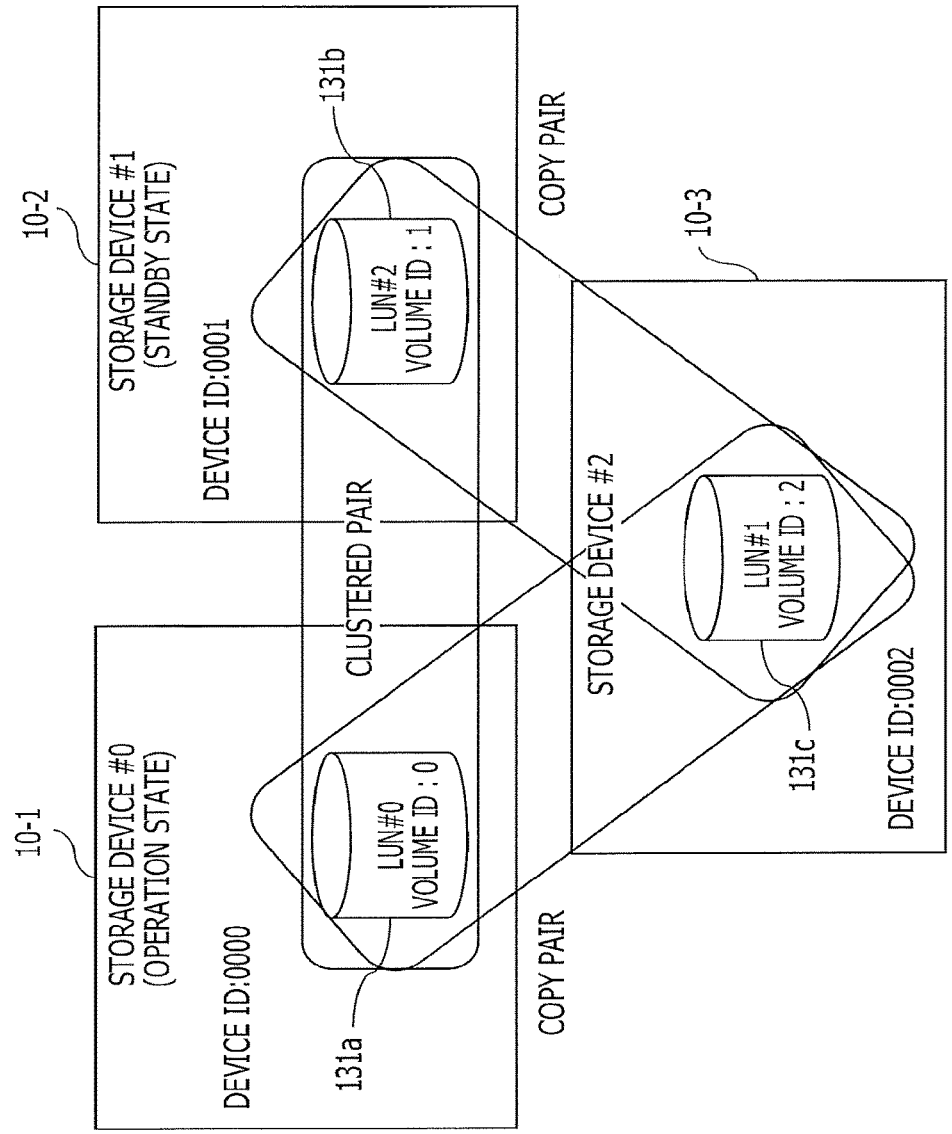
FIG. 8 is a diagram illustrating a correlation of storage areas in the storage system as the example of the embodiment.

In this embodiment, as illustratively illustrated in FIG. 8, a storage area (volume) included in the storage device 10-1 is represented by symbol 131a. Similarly, a storage area (volume) included in the storage device 10-2 is represented by symbol 131b, and a storage area (volume) included in the storage device 10-3 is represented by symbol 131c.

Hereinafter, as a symbol to represent a storage area, symbols 131a, 131b, 131c are used when it is desirable to identify one of multiple storage areas, while symbol 131 is used to refer to any storage device.

A CM 111 is a storage control device to perform various controls in the storage device 10. The CM 111 performs various types of controls such as control on access to the storage unit 130 or the like, according to an I/O processing request from the host device 2.

As illustrated in FIG. 6, the CM 111 includes the memory 121, the CPU 110, and the adaptors 124, 125, 126. Note that the embodiment illustrates an example in which one CM 111 is included in the storage device 10. However, the embodiment is not limited to this, and one storage device 10 includes two or more CMs 111.

The adaptor 124 is an interface controller communicably connected to the host device 2 and connected to the adaptor of the host device 2 by way of a communication line. The adaptor 124 is a network adaptor or a fiber channel adaptor.

Then, if the operator instructs, from the terminal device 4, to copy data from the copy source volume 131a to the copy destination volume 131c, this adaptor 124 receives this instruction to copy data.

The adaptor 125 is an interface controller that is communicably connected with another storage device 10 or the like by way of a line, which is not illustrated.

The adaptor 126 is an interface controller which is communicably connected to the DE 200 (storage unit 130) by way of a line, which is not illustrated.

The memory 121 is a storage memory including a ROM and a RAM.

The RAM of the memory 121 temporarily stores various data or programs. A predetermined area in the RAM temporarily stores data received from the host device 2 or data to be transmitted to the host device 2. With this, the RAM also acts as a cache memory or a buffer memory.

Furthermore, data or program is temporarily stored or deployed in other predetermined area in the RAM, when the CPU 110 to be described below executes a program.

The ROM of the memory 121 stores a program executed by the CPU 110 or various types of data.

The CPU 110 is a processor that performs various types of controls or calculations and implements functions as an access controller 11 and a copy controller 12 to be described below, by executing a program stored in the ROM or the like of the memory 121.

Then, the CPU 110 of the CM 111 functions as the access controller 11 and the copy controller 12 to be described below by executing a copy control program.

Note that the program (copy control program) to implement the functions of the access controller 11 and the copy controller 12 is provided in the form recorded in a computer readable recording medium such as a flexible disk, CD (CD-ROM, CD-R, CD-RW or the like), DVD (DVD-ROM, DVD-RAM, DVD-R, DVD+R, DVD-RW, DVD+RW, HD DVD, or the like), a Blu-ray disk, a magnetic disk, an optical disk, a magneto-optic disk or the like. Then, the computer reads the program from that recording medium, transfers the program to an internal storage unit or an external storage unit, and stores and uses the program. Alternatively, the program may be recorded in a storage unit (recording medium) such as a magnetic disk, an optical disk, a magneto-optic disk or the like and provided to the computer from that storage unit by way of a communication path.

When the functions as the access controller 11 and the copy controller 12 are implemented, a program stored in the internal storage unit (memory 121 in this embodiment) is executed by a microprocessor (CPU 110 in this embodiment) of the computer. Then, a program recorded in a recording medium may also be read and executed by the computer.

In this embodiment, the two storage devices 10-1, 10-2 are connected to the host device 2. These storage devices 10-1 and 10-2 may be arranged in each of separate buildings that are adjacent to each other.

It is also desirable that the storage device 10-3 is located at a position (remote location) that is geographically spaced a predetermined distance or longer from the storage devices 10-1, 10-2.

(B) Functions

FIG. 8 is a diagram illustrating a correlation of storage areas in the storage system 1 as the example of the embodiment.

Hereinafter, a storage area of each storage device 10 may be represented by using a logical unit number (LUN). In the example described below, the storage area 131a of the storage device 10-1 is represented as LUN #0. In addition, the storage area 131b of the storage device 10-2 is represented as LUN #2, and the storage area 131c of the storage device 10-3 as LUN #1.

As illustrated in FIG. 7, the storage device 10-1 and the storage device 10-2 are clustered (storage clustered). In an operation state, the storage device 10-1 used as a master performs synchronous copying of data in the storage area 131a (LUN #0) in the storage device 10-1 to be accessed from the host device 2 to the storage area 131b (LUN #2) of the storage device 10-2 used as a slave.

With this synchronous copying, the data in the storage area 131a of the storage device 10-1 and the data in the storage area 131b of the storage device 10-2 are synchronized and consistent with each other. More specifically, the storage area 131a of the storage device 10-1 and the storage area 131b of the storage device 10-2 form a clustered pair and are made redundant.

If the storage device 10-1 which is the master is in the operation state, the storage device 10-2 which is the slave is in the standby state. Then, if abnormality is detected in the storage device 10-1, the master, failover to the storage device 10-2, the slave, is performed. Note that this failover may be implemented with various known techniques, a description of which is omitted.

In addition, the storage area 131a (LUN #0) of the storage device 10-1 is set as a copy pair with the storage area 131c (LUN #1) of the storage device 10-3 placed in a location (remote location) which is geographically remote from the storage devices 10-1, 10-2. With this, the data in the storage area 131a of the storage device 10-1 is asynchronously copied (remote copying, asynchronous copying) to the storage area 131c of the storage device 10-3.

Similarly, the storage area 131b (LUN #2) of the storage device 10-2 is also set as a copy pair with the storage area 131c (LUN #1) of the storage device 10-3. With this, the data in the storage area 131b of the storage device 10-2 is asynchronously copied to the storage area 131c of the storage device 10-3.

In this storage system 1, the storage devices 10-1, 10-2 on which synchronous copying is performed and the storage device 10-3 on which remote copying from these storage devices 10-1, 10-2 are performed form a group (copy group).

Setting of copying (synchronous copying, asynchronous copying) between the storage areas of the respective storage devices 10 is set or registered by a system administrator (storage manager) inputting to the management server 3 using the terminal device 4 by way of a graphical user interface (GUI) or the like. Note that setting of copying (synchronous copying, asynchronous copying) between the storage areas of the respective storage devices 10 may be implemented with an existing technique, a description of which is omitted.

(B1) Functions of the Management Server

As illustrated in FIG. 4, the management server 3 is equipped with the functions as the setting controller 301.

The setting controller 301 manages various settings in this storage system 1. For example, the setting controller 301 uses a device information table 302 (see FIG. 9), a volume management table 303 (see FIG. 10), and a copy pair table 304 (see FIG. 11) to manage various settings.

In addition, information in the device information table 302, the volume management table 303, and the copy pair table 304 is stored in a storage area of the memory 311, for example.

For example, the system administrator makes an input that the storage device 10-1 and the storage device 10-2 are clustered, through the terminal device 4. With this, the setting controller 301 synchronizes the storage area 131a of the storage device 10-1 and the storage area 131b of the storage device 10-2 as a clustered pair (cluster pair).

The setting controller 301 manages these storage devices 10-1, 10-2 as a device pair by using the device information table 302.

FIG. 9 is a diagram illustrating the device information table 302 in the storage system 1 as an example of the embodiment.

The device information table 302 illustrated in FIG. 9 is formed through association of a primary device ID, a secondary device ID, and an active device with a device pair ID.

The device pair ID is identification information to identify a combination (cluster pair) of clustered storage devices 10.

The primary device ID is a device ID to identify a primary storage device in a pair of clustered storage devices 10. A secondary device ID is a device ID to identify a secondary storage device 10 in a pair of clustered storage devices 10.

The active device ID is a device ID of the storage device 10 which is enabled and in the operation state in the pair of clustered storage devices 10. The primary device ID is set for this active device ID in a state where failover is not performed and, the secondary device ID is set for this active device ID in a state where failover is performed.

In this embodiment, the device ID of the storage device 10-1 is "0000" and the device ID of the storage device 10-2 is "0001". Therefore, the device information table 302 illustratively illustrated in FIG. 9 illustrates that the storage device 10-1 is primary and the storage device 10-2 is secondary. In addition, the device information table 302 illustrates that the storage device 10-1 is in an active state (operation information) as a cluster.

In addition, the setting controller 301 manages a volume in this storage system 1, using the volume management table 303.

FIG. 10 is a diagram illustrating the volume management table 303 in the storage system 1 as the example of the embodiment.

The volume management table 303 illustrated in this FIG. 10 is formed through association of a LUN, a device ID, and block size with a volume ID.

The volume ID is identification information to identify the storage area 131 (volume). The LUN represents LUN associated with that storage area 131. The device ID is identification information to identify the storage device 10 in which the storage area is formed. The block size represents size of the storage area 131. Note that the block size is size for a file system to manage data in a storage unit such as an HDD or the like, and that a storage area is divided and managed by a certain fixed size unit (4 Kbyte, for example).

In the example illustrated in FIG. 10, a volume (storage area) with a volume ID being "0" corresponds to LUN #01, is included in the storage device 10-1, and has the block size of "39062".

In addition, the system administrator makes an input through the terminal device 4 that a pair of remote copying (copy pair) is set by the storage area 131a of the storage device in the operation state (first storage device) 10-1 and the storage area 131c of the storage device 10-3 located in a remote place.

The setting controller 301 manages the storage area 131 that forms these remote copying pairs using the copy pair table 304.

The setting controller 301 acquires volume information from the storage device 10-1 in the operation state and stores in the copy pair table 304 a copy pair of the storage area 131b (LUN #0) of the storage device 10-1 and the storage area 131c (LUN #1) of the storage device 10-3.

In addition, the setting controller 301 acquires from the storage device 10-2 volume information of the storage area 131b corresponding to the storage area 131a of the storage device 10-1, and stores in the copy pair table 304 a copy pair of the storage area 131b (LUN #2) of the storage device 10-2 and the storage area 131c (LUN #1) of the storage device 10-3.

Figure 11:
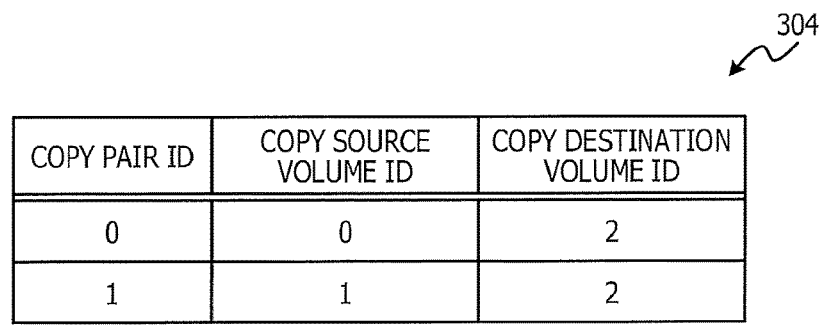
FIG. 11 is a diagram illustrating a copy pair table in the storage system as the example of the embodiment.

FIG. 11 is a diagram illustrating the copy pair table 304 in the storage system 1 as the example of the embodiment.

The copy pair table 304 illustrated in this FIG. 11 is formed through association of a copy source volume ID and a copy destination volume ID with a copy pair ID.

The copy pair is identification information to identify a combination (copy pair) of the storage areas 131 that form the copy pair.

The copy source volume ID is identification information to identify the storage area 131 (volume) at a copy source in remote copying. The copy destination volume ID is identification information to identify the storage area 131 (volume) at the copy destination.

In the example illustrated in FIG. 11, the copy pair ID "0" represents remote copying that copies the storage area 131a of the storage device 10-1 to the storage area 131c of the storage device 10-3. In addition, the copy pair ID "1" represents remote copying that copies the storage area 131b of the storage device 10-2 to the storage area 131c of the storage device 10-3.

(B2) Functions of the Storage Device

As illustrated in FIG. 4, the storage devices 10-1, 10-2 are equipped with functions as the access controller 11, the copy controller 12, and a storage 13.

Note that in the figures, as the same symbol as the symbol described above illustrates the same part, and thus a detailed description thereof is omitted.

The storage 13 stores various types of data or the like, and is implemented by the storage area 131 of the storage unit 130.

The storage 13 stores information of the group management table 305 and the copy management table 306.

FIGS. 12A and 12B are diagrams illustrating the group management table 305 and the copy management table 306 of the storage devices 10-1, 10-2 of the storage system 1 as the example of the embodiment.

Note that FIG. 12A depicts the group management table 305 and the copy management table 306 included in the storage device 10-1, and FIG. 12B depicts the group management table 305 and the copy management table 306 included in the storage device 10-2.

In addition, FIG. 13 is a diagram illustrating the group management table 305 and the copy management table 306 of the storage device 10-3.

The group management table 305 is information related to a copy group of the owner storage device 10, and as illustrated in FIG. 11, includes a group ID, usage status, operation status, a counterpart device ID, LUN, and a remote device ID.

The group ID is identification information to identify a copy group. For example, as depicted in FIG. 12A, "0" is set in the storage device #0.

The usage status indicates whether the owner storage device 10 is primary or secondary. For example, as depicted in FIG. 12A, information indicating that the owner storage device 10 is primary is set in the storage device #0.

The operation status indicates whether the owner storage device 10 is in an active state or in a standby state. For example, as depicted in FIG. 12A, information indicating that the owner storage device 10 is in the active state is set in the storage device #0.

The counterpart device ID is identification information of a storage device 10 which is a counterpart of synchronous copying. For example, "0001" indicating the storage device #1 is set in the storage device #0 depicted in FIG. 12A.

The LUN represents a volume targeted for copying in the owner storage device 10. For example, as depicted in FIG. 12A, the volume ID "0" representing LUN #0 is set in the storage device #0.

The remote device ID is identification information of the storage device 10 which is a counterpart of remote copying. For example, as depicted in FIG. 12A, "0002" indicating the storage device #3 is set in the storage device #0.

The copy management table 306 is information related to copying (copy session) performed by the owner storage device 10, and as illustrated in FIG. 12, is formed through association of a copy source LUN and a copy destination LUN with a session ID. In addition, as for remote copying, the copy management table 306 is formed through association of a copy bit map with the session ID, in addition to the copy source LUN and the copy destination LUN.

The copy source LUN represents volume of a copy source. In the storage device #0 depicted in FIG. 12A, for example, while copying of a session "0" is synchronous copying, a volume ID "0" indicating the LUN #0 is set.

The copy destination LUN represents volume of a copy destination. In the storage device #0 depicted in FIG. 12A, for example, while copying of the session "0" is synchronous copying, a volume ID "2" indicating the LUN #1 is set.

For a copy map, a copy bit map 132 which is used in remote copying is set.

Note that since the storage device #2 acts as a receiving side of a remote copy, as illustrated in FIG. 13, the copy management table 306 does not include a copy map in the storage device #2.

The copy controller 12 performs copying between the storage device 10 in which the copy controller 12 itself is implemented (hereinafter referred to as an owner storage device) and another storage device (hereinafter referred to as the other storage device) 10.

The copy controller 12 performs synchronous copying. For example, when the host device 2 updates data in a storage area (hereinafter referred to as an own storage area) 131a included in the owner storage device 10-1, the copy controller 12 of the storage device 10-1 transmits update data to the other storage device 10-2 that forms a cluster pair, the update data being information indicating data updated in the own storage area 131a. The other storage device 10-2 that receives the update data applies this update data to an own storage area 131*b*, and thereby perform synchronization making the own storage area 131*b* consistent with the storage area 131*a* of the storage device 10-1.

In addition, the copy controller 12 performs remote copying through asynchronous copying. When performing remote copying, the copy controller 12 of the storage device 10-1, for example, sequentially refers to bits from the beginning of the copy bit map 132*a*. If the bit referred to is 1, the copy controller 12 acquires an exclusive right of the copy bit map 132*a*, and transfers update data (copy data) corresponding to the bit referred in the copy bit map 132*a* to the other storage device 10-3.

When the transfer of the update data is completed, the copy controller 12 of the storage device 10-1 first notifies the storage device 10-2, which is a transmission destination of the update data in synchronous copying, of an instruction to update the copy bit map 132*b*. More specifically, a corresponding bit in the copy bit map 132*b* of the storage device 10-2 is set to 0, thereby indicating the completion of update with the update data.

Then, the copy controller 12 sets a corresponding bit of the copy bit map 132*a* of the owner storage device 10-1 to 0, thereby indicating the completion of update with the update data. Then, the exclusive right of the copy bit map 132*a* is released.

More specifically, the copy controller 12 causes the other storage device 10 which forms a cluster pair to perform updating of the copy bit map 132, earlier than updating of the copy bit map 132 of the owner storage device 10.

When reference to all bits in the copy bit map 132*a* is completed, the copy controller 12 repeatedly performs reference again, from a top bit of the copy bit map 132.

In addition, if a failure occurs in the storage device 10-1 and failover is performed, then, the copy controller 12 of the storage device 10-2 uses the copy bit map 132*b* to perform remote copying through asynchronous copying. For example, the copy controller 12 of the storage device 10-2 sequentially refers to bits from the beginning of the copy bit map 132*b*. If the bit referred to is 1, the copy controller 12 acquires an exclusive right of the copy bit map 132*b*, and transfers to the other storage device 10-3 the update data (copy data) corresponding to the bit referred to in the copy bit map 132*b*.

More specifically, during failover from the storage device 10-1 to the storage device 10-2, the storage device 10-2 takes over and performs asynchronous copying, which the storage device 10-1 performs with the storage device 10-3, from the storage device 10-3 using the copy bit map 132*b*.

The access controller 11 performs data access to the storage area 131 so as to process an input/output (I/O) processing request (data access request) of read or write from the host device 2.

When a write request comes from the host device 2, the access controller 11 acquires an exclusive right of bits corresponding to the I/O target area in the copy bit map 132 of the owner storage device 10.

Then, the access controller 11 updates the storage area 131 of the storage device 10 at the copy destination, and furthermore sets 1 to the corresponding bit in the copy bit map 132 of the storage device 10 at the copy destination. Then, the access controller 11 updates the storage area 131 of the owner storage device 10 according to the write request from the host device 2, and sets 1 to the corresponding bit in the copy bit map 132 of the owner storage device 10. Then, the access controller 11 releases the exclusive right of the copy bit map 132.

The storage device 10-3 is equipped with the functions as the storage 13 and a receiver 14.

The receiver 14 receives the update data from the storage device 10-1 and writes this update data received into the storage area 131*c*.

If the storage device 10-3 performs asynchronous copying with the storage device 10-1 or the storage device 10-2, the storage device 10-3 receives a write request of, for example, copy data (write data) from the storage devices 10-1, 10-2, and may transmit a completion acknowledgment of this write to the storage devices 10-1, 10-2 at the timing when storage of the write data into the cache memory (memory 121) included in the storage device 10-3 itself is completed. Then, through background processing, the storage device 10-3 appropriately writes the data into the storage area 131*c* which is allocated to the storage 13.

In addition, if a failure occurs in the storage device 10-1 and failover is performed, then, the storage device 10-3 receives the update data from the storage device 10-2 and writes this update data received into the storage 13 (storage area 131*c*).

In the storage device 10-3, the data received by the reception device 14 is stored in the storage 13.

As illustrated in FIG. 4, the host device 2 is equipped with the function as the access unit 15.

The access unit 15 performs data input or output (data access) on a storage area (volume) 131 provided by the storage device 10. Specifically, the access unit 15 performs data access to the storage area 131 provided by the storage device 10 the operating status of which is active.

(C) Operation

Figure 14:
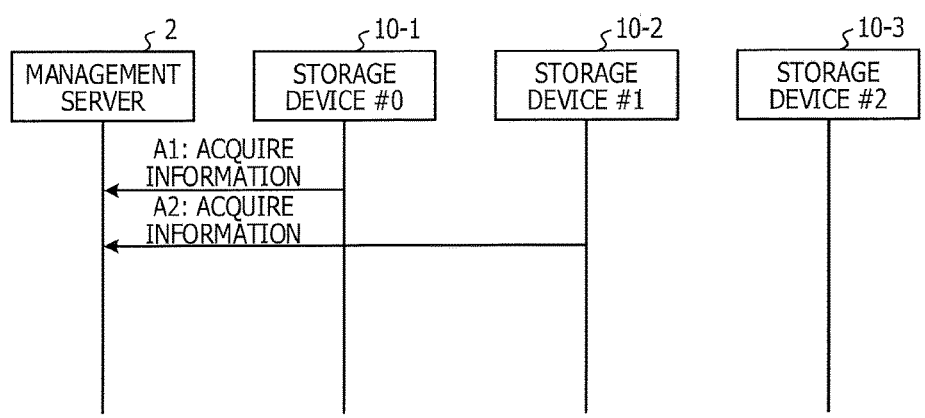
FIG. 14 is a sequence diagram for describing processing when a copy pair is set in the storage system as the example of the embodiment.

Processing when a copy pair is set in the storage system 1 as the example of thus configured embodiment is described according to the sequence diagram illustrated in FIG. 14.

Using the terminal device 4, the storage manager clusters the storage device 10-1 and the storage device 10-2. This synchronizes the storage area 131*a* of the storage device 10-1 and the storage area 131*b* of the storage device 10-2.

In addition, using the terminal device 4, the storage manager sets a copy pair of the storage area 131*a* of the storage device 10-1 and the storage area 131*c* of the storage device 10-3. In the management server 3, the setting controller 301 acquires volume information from the storage device 10-1 which is in the operation state (see symbol A1 in FIG. 14). The setting controller 301 registers the storage area 131*a* of the storage device 10-1 and the storage area 131*c* of the storage device 10-3 as a copy pair in the copy pair table 304.

The setting controller 301 acquires from the storage device 10-2 volume information on the storage area 131*b* corresponding to the storage area 131*a* of the storage device 10-1 (see symbol A2 in FIG. 14). The setting controller 301 also registers a copy pair of the storage area 131*b* of the storage device 10-2 and the storage area 131*c* of the storage device 10-3 in the copy pair table 304.

Processing of remote copying between the storage device 10-1 and the storage device 10-3 in the storage system 1 which is the example of the embodiment is described hereinafter with reference to the sequence diagram illustrated in FIG. 15.

Using the terminal device 4, the storage manager inputs an instruction to start remote copying from the data area of the storage device 10-1 to the data area of the storage device 10-3. With this, a request to start remote copying is transmitted from the management server 3 to the storage device 10-1 (see symbol 131 in FIG. 15). Since remote copying is asynchronous copying, the storage device 10-1 transmits a completion acknowledgment to the management server 3 (see symbol B2 in FIG. 15).

After copying starts, the copy controller 12 and the access controller 11 operate in the storage device 10-1.

Figure 15:
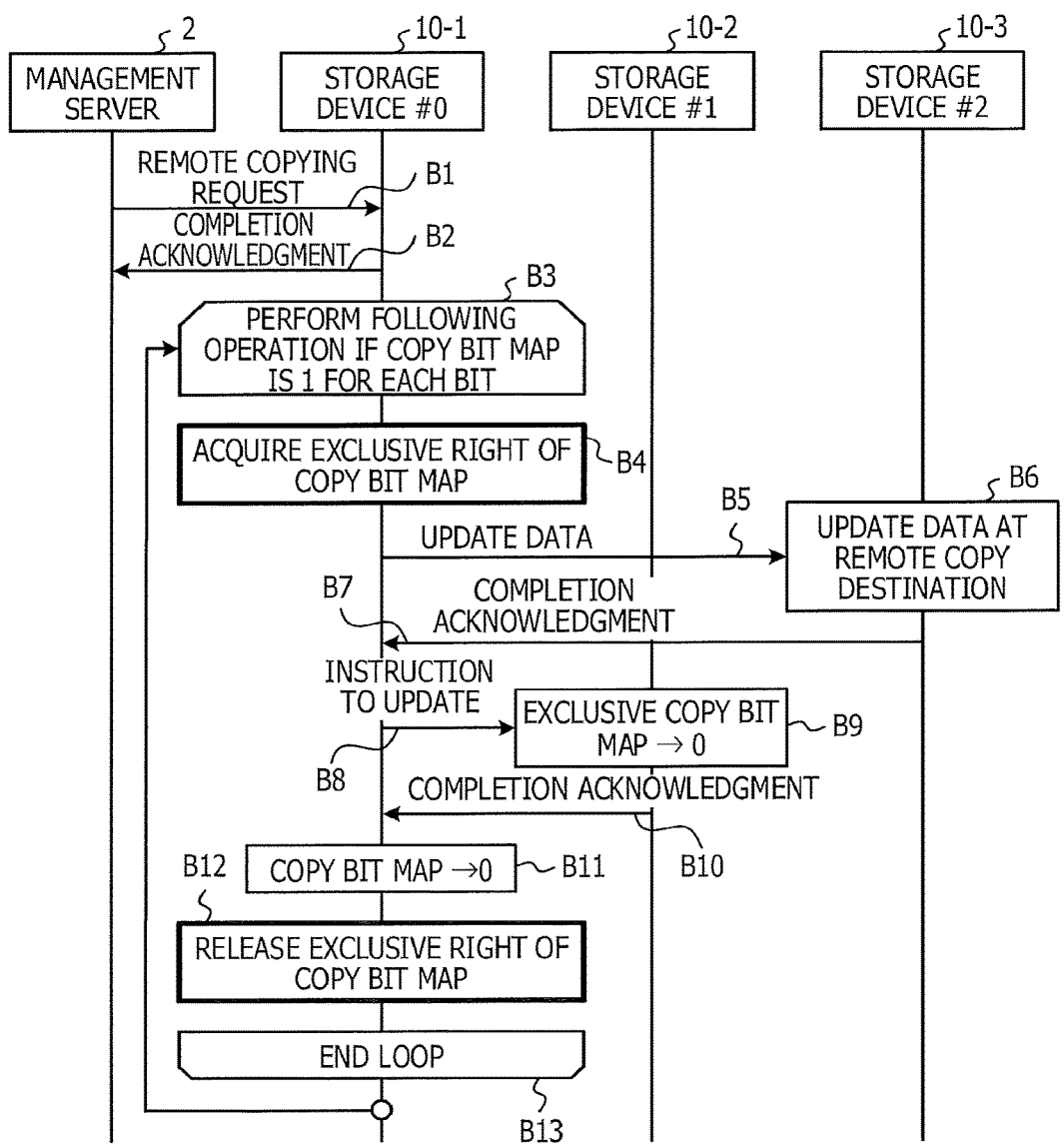
FIG. 15 is a sequence diagram for describing processing of remote copying between storage devices in the storage system as the example of the embodiment.

The copy controller 12 sequentially refers to (scans) bits in this copy bit map 132, and performs the following processing when the bit is 1 (see symbol B3 in FIG. 15).

More specifically, the copy controller 12 acquires an exclusive right of the copy bit map 132 for which the bit is 1 (see symbol B4 in FIG. 15) and transfers the update data to the storage device 10-3 (see symbol B5 in FIG. 15).

The storage device 10-3 uses the update data received to update data in the storage area 131c (see symbol B6 in FIG. 15), and transmits a completion acknowledgment of data updating to the storage device 10-1 (see symbol B7 in FIG. 15).

When transfer of the update data is completed, the copy controller 12 of the storage device 10-1 transmits an instruction to update the copy bit map 132 to the storage device 10-2 (see symbol B8 in FIG. 15). In the storage device 10-2, the copy controller 12 sets the corresponding bit in the copy bit map 132b to 0 (see symbol B9 in FIG. 15).

A completion acknowledgment of updating of the copy bit map 132b is transmitted from the storage device 10-2 to the storage device 10-1 (see symbol B10 in FIG. 15). When the storage device 10-1 receives the completion acknowledgment, then, the copy controller 12 sets a corresponding bit in the copy bit map 132a to 0 (see symbol B11 in FIG. 15).

As such, in this storage system 1, updating of the copy bit map 132b of the storage device 10-2 which is a cluster pair of the storage device 10-1 is performed at the timing which is immediately after the data in the storage area 131c of the storage device 10-3 is updated and which is earlier than updating of the copy bit map 132a of the storage device 10-1.

With this, the copy bit map 132b of the storage device 10-2 promptly enters a state consistent with the data storage state in the storage area 131c of the storage device 10-3.

Then, the copy controller 12 releases the exclusive right of the copy bit map 132a (see symbol B12 in FIG. 15).

Then, loop end processing is implemented in the storage device 10-1 (see symbol B13 in FIG. 15). Now, if reference to all bits in the copy bit map 132a is completed, the processing returns to the processing of symbol B3 in FIG. 15, and reference is repeated from the beginning of the copy bit map 132a.

Figure 16:
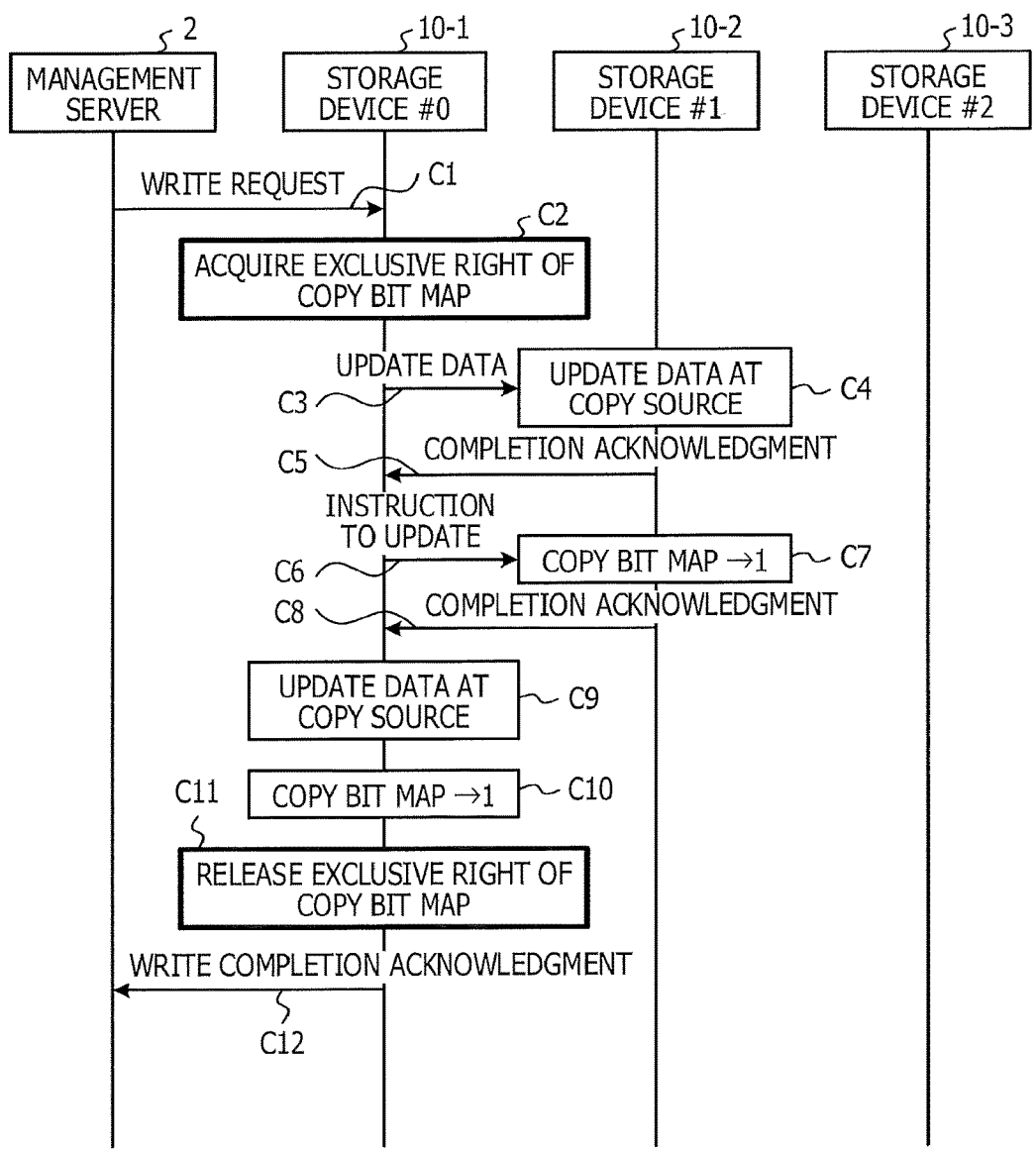
FIG. 16 is a sequence diagram for describing processing when a write request is made from a host device to a storage device in the storage system as an example of the embodiment.

Then, processing if a write request is made from the host device 2 to the storage device 10-1 in the storage system 1 as the example of the embodiment, is described following the sequence diagram illustrated in FIG. 16.

When the write request is transmitted from the host device 2 to the storage device 10-1 (see symbol C1 in FIG. 16), the access controller 11 in the storage device 10-1 acquires an exclusive right of a corresponding bit of the copy bit map 132a in the storage device 10-1 (see symbol C2 in FIG. 16).

The access controller 11 of the storage device 10-1 transmits to the storage device 10-2 update data based on the write request from the host device 2 (see symbol C3 in FIG. 16).

Using the update data, the storage device 10-2 updates the storage area 131b, which is a copy source of remote copying (see symbol C4 in FIG. 16). With this, writing for the write request made by the host device 2 to the storage device 10-1 is promptly done in the storage area 131b of the storage device 10-2. In addition, the storage device 10-2 transmits a completion acknowledgment of data updating to the storage device 10-1 (see symbol C5 in FIG. 16).

Then, the access controller 11 of the storage device 10-1 transmits to the storage device 10-2 an instruction to update the copy bit map 132b (see symbol C6 in FIG. 16). In the storage device 10-2, the copy controller 12, for example, sets the corresponding bit in the copy bit map 132b to 1 (see symbol C7 in FIG. 16). With this, the copy bit map 132b of the storage device 10-2 enters a state consistent with the data storage state in the storage area 131b of the storage device 10-2.

When a completion acknowledgment of updating of the copy bit map 132b is transmitted from the storage device 10-2 to the storage device 10-1 (see symbol C8 in FIG. 16), then, in the storage device 10-1, the access controller 11 updates the storage area 131a which is a copy source of remote copying, in response to the write request from the host device 2 (see symbol C9 in FIG. 16). More specifically, data updating at the copy source of synchronous copying is performed. With this, the data storage state of the storage area 131a of the storage device 10-1 is consistent with the data storage state of the storage area 131b of the storage device 10-2.

Then, in the storage device 10-1, the access controller 11 sets the corresponding bit in the copy bit map 132a to 1 (see symbol C10 in FIG. 16). Therefore, when writing for the write request from the host device 2 in the storage area 131a and updating of the copy bit map 132a are completed in the storage device 10-1, writing for the write request from the host device 2 in the storage area 131b and updating of the copy bit map 132b are already completed in the storage device 10-2. In addition, when the storage device 10-1 completes the updating of the copy bit map 132a, the copy bit map 132b of the storage device 10-2 is consistent with the copy bit map 132a.

As such, in this storage system 1, updating of the copy bit map 132b of the storage device 10-2, which is a cluster pair of the storage device 10-1, is performed at the timing which is immediately after the updating of data in the storage area 131b of the storage device 10-2 and which is earlier than the updating of the copy bit map 132a of the storage device 10-1.

With this, the copy bit map 132b of the storage device 10-2 promptly enters a state consistent with the data storage state in the storage area 131b of the storage device 10-2.

When updating of the copy bit map 132a is performed, the access controller 11 releases the exclusive right of the copy bit map 132a (see symbol C11 in FIG. 16). The access controller 11 also transmits a write completion acknowledgment to the host device 2 (see symbol C12 in FIG. 16) and finishes the processing.

Processing during failover due to detection of a failure of a storage device in the storage system 1 as the example of the embodiment is described hereinafter according to the sequence diagram illustrated in FIG. 17.

Note that in this processing, operation by the storage manager is not requested.

The example illustrated below is an example in which a failure is detected in the storage device 10-1. If a failure is detected in the storage device 10-1 which is primary, the storage device 10-1 transmits a failover request to the storage device 10-2 which is secondary (see symbol D1 in FIG. 17).

Figure 17:
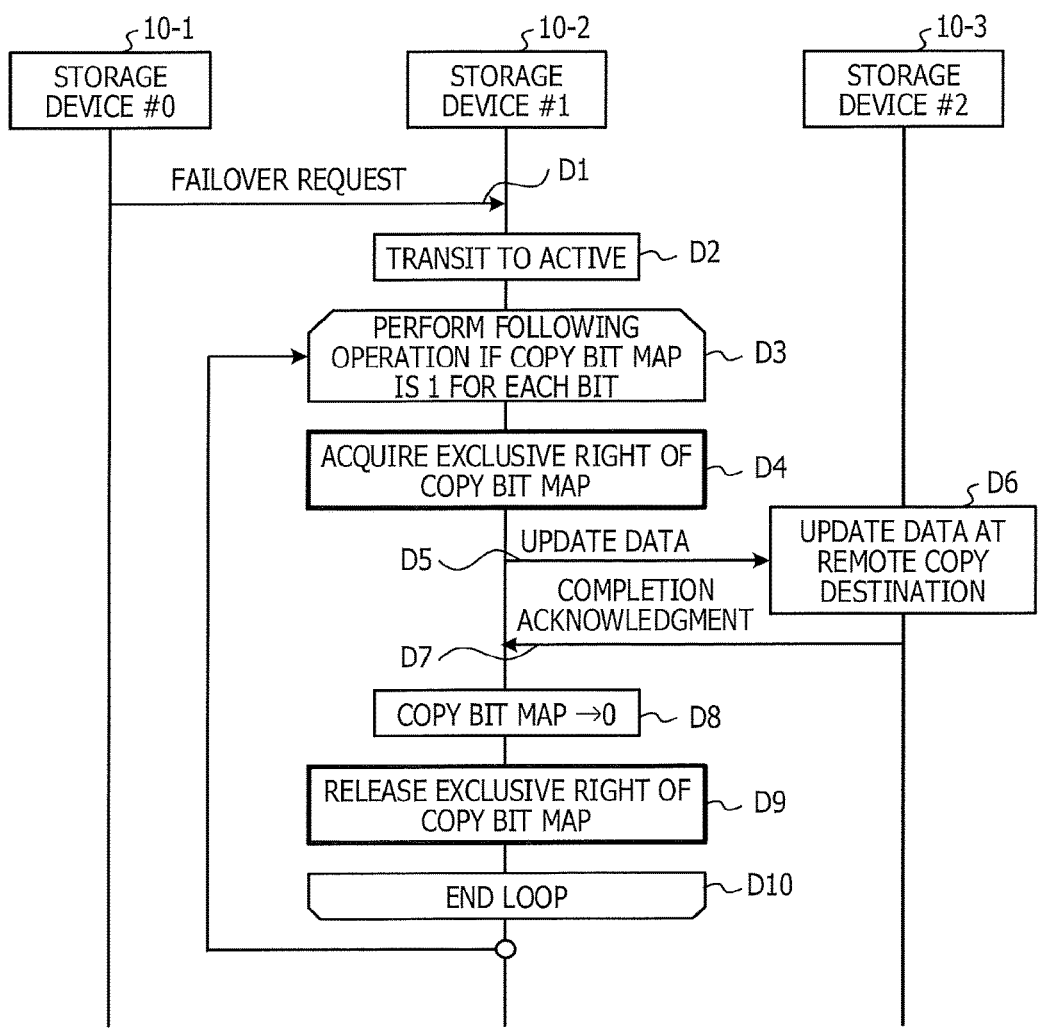
FIG. 17 is a sequence diagram for describing processing in the case of failover due to detection of a failure in a storage device in the storage system as the example of the embodiment.

The storage device 10-2 that receives the failover request shifts (transits) to an active state from a standby state (see symbol D2 in FIG. 17).

In the storage device 10-2, the copy controller 12 sequentially refers to bits in the copy bit map 132b and performs the following processing when the bit is 1 (see symbol D3 in FIG. 17).

More specifically, the copy controller 12 acquires an exclusive right of the copy bit map 132b for which the bit is 1 (see symbol D4 in FIG. 17) and transfers update data to the storage device 10-3 (see symbol D5 in FIG. 17).

In the storage device 10-3, the receiver 14 receives the update data from the storage device 10-2 and uses this update data received to update the data in the storage area 131c (see symbol D6 in FIG. 17: remote copying). The receiver 14 also transmits a completion acknowledgment of the data updating to the storage device 10-2 (see symbol D7 in FIG. 17).

Then, in the storage device 10-2, the copy controller 12 sets 0 to the corresponding bit in the copy bit map 132b (see symbol D8 in FIG. 17) and releases the exclusive right (see symbol D9 in FIG. 17).

Then, in the storage device 10-2, the loop end processing is carried out (see symbol D10 in FIG. 17). Now, if the reference to all bits in the copy bit map 132b is completed, processing returns to the processing of symbol D3 in FIG. 17 and reference is repeated from the beginning of the copy bit map 132b again.

Processing in a case in which a write request is made by the host device 2 to the storage device 10 after failover in the storage system 1 as the example of the embodiment is described hereinafter according to the sequence diagram illustrated in FIG. 18.

Figure 18:
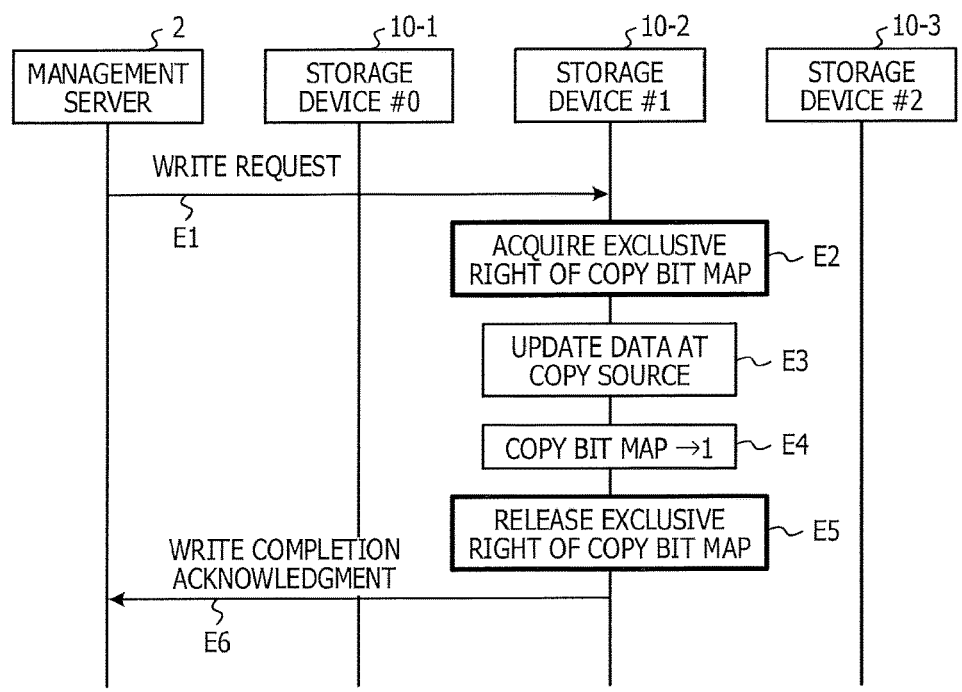
FIG. 18 is a sequence diagram for describing processing when a write request is made from the host device to the storage device after the failover, in the storage system as the example of the embodiment.

In the example illustrated in FIG. 18, a write request is made by the host device 2 to the storage device 10-2 in a state after a failure is detected in the storage device 10-1 and failover to the storage device 10-2 is performed.

When the write request is transmitted from the host device 2 to the storage device 10-2 (see symbol E1 in FIG. 18), the access controller 11 in the storage device 10-2 acquires an exclusive right of a corresponding bit in an I/O target area of the copy bit map 132b in the storage device 10-2 (see symbol E2 in FIG. 18).

The access controller 11 of the storage device 10-2 performs data updating based on the write request from the host device 2 to the storage device 10-2, which is a copy source of remote copying (see symbol E3 in FIG. 18).

In addition, in the storage device 10-2, the copy controller 12, for example, sets 1 to the corresponding bit in the copy bit map 132b (see symbol E4 in FIG. 18).

When updating of the copy bit map 132b is performed, the access controller 11 releases the exclusive right to the I/O target area of the copy bit map 132b (see symbol E5 in FIG. 18). In addition, the access controller 11 transmits a write completion acknowledgment to the host device 2 (see symbol E6 in FIG. 18) and finishes the processing.

(D) Effect

As such, according to the storage system 1 as the example of the embodiment, during remote copying from the storage device 10-1 to the storage device 10-3, updating of the copy bit map 132b of the storage device 10-2, which is a cluster pair of the storage device 10-1, is performed at the timing which is immediately after updating of the data in the storage area 131c of the storage device 10-3 and which is earlier than updating of the copy bit map 132a of the storage device 10-1.

This may promptly enable the copy bit map 132b of the storage device 10-2 to enter a state consistent with the data storage state of the storage area 131c of the storage device 10-3.

If a failure occurs in the storage device 10-1 and failover is performed, the storage device 10-2 performs remote copying using the copy bit map 132b. With this, rather than having to perform remote copying from the beginning, the storage device 10-2 may take over and continue the remote copying performed by the storage device 10-1. In addition, the storage device 10-2 performing remote copying with the storage device 10-3 using the copy bit map 132b which is consistent with the data storage state of the storage area 131c, the quality of remote copying may be improved and reliability of copy data in the storage area 131c of the storage device 10-3 may be improved.

In addition, when the host device 2 writes into the storage area 131a of the storage device 10-1, updating of the copy bit map 132b of the storage device 10-2, which is a cluster pair of the storage device 10-1, is performed at the timing which is immediately after updating of the data in the storage area 131b of the storage device 10-2 and which is earlier than updating of the copy bit map 132a of the storage device 10-1.

(Continuously) Performing the updating of the copy bit map 132b immediately after the updating of the data in the storage area 131b of the storage device 10-2 may enable the copy bit map 132b of the storage device 10-2 to enter a state consistent with the data storage state of the storage area 131b. More specifically, reliability of the copy bit map 132b may be improved.

Performing the updating of the copy bit map 132b immediately after the updating of the data in the storage area 131b of the storage device 10-2 may shorten a period of time from when updating of the data in the storage area 131b is performed to when updating of the copy bit map 132b is performed, thereby reducing the possibility of a failure occurring in the storage device 10-1 in this period of time. It may be said that the period of time from when the updating of the data in the storage area 131b is performed to when the updating of the copy bit map 132b is performed is in a state where the data storage state of the storage area 131b is inconsistent with the copy bit map 132b. This storage system 1 may shorten the period of time of such an inconsistent state.

In addition, performing the updating of the copy bit map 132b of the storage device 10-2 earlier than the updating of the copy bit map 132a of the storage device 10-1 may also shorten the period of time from when the updating of the data in the storage area 131b is performed to when the updating of the copy bit map 132b is performed. More specifically, the possibility of a failure occurring in the storage device 10-1 in this period of time may be reduced.

This storage system 1 may improve the reliability of remote copying by reducing such a state where the data storage state of the storage area 131b is inconsistent with the copy bit map 132b.

Performing remote copying using such a copy bit map 132b makes it possible to continuously perform remote copying even when a failure occurs in the storage device 10-1. More specifically, a period of time taken for remote copying may be shortened. In addition, after failover, performing remote copying with the storage device 10-3 using the reliable copy bit map 132b may improve the quality of remote copying and improve the reliability of the storage device 10-3.

Figure 19B:
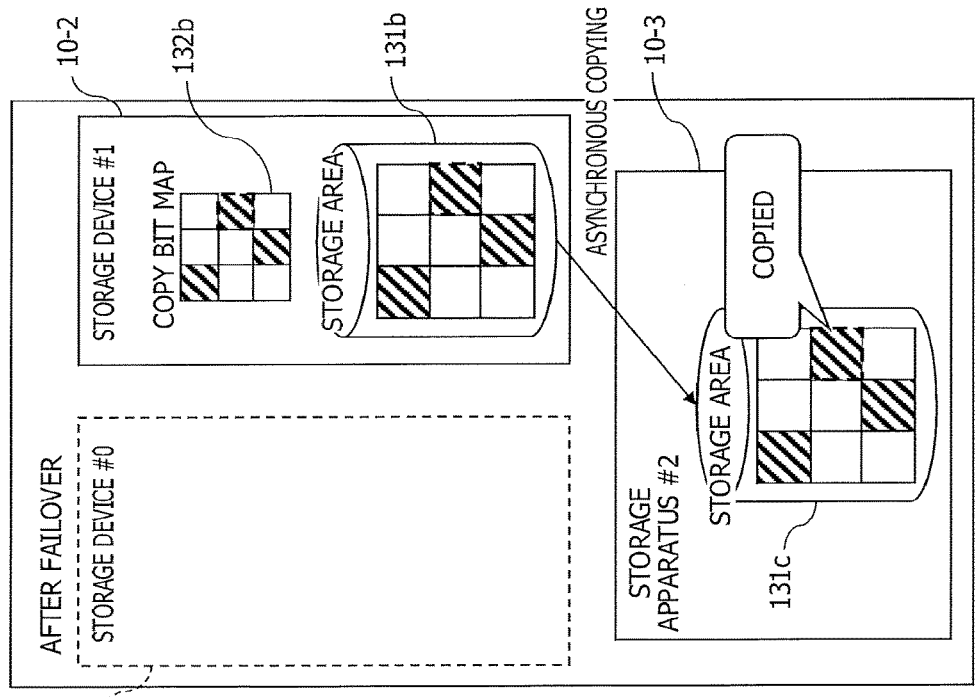
FIGS. 19A and 19B are diagrams illustrating the states of the copy bit map and the storage areas before and after the failover in the storage system as the example of the embodiment.
Figure 19A:
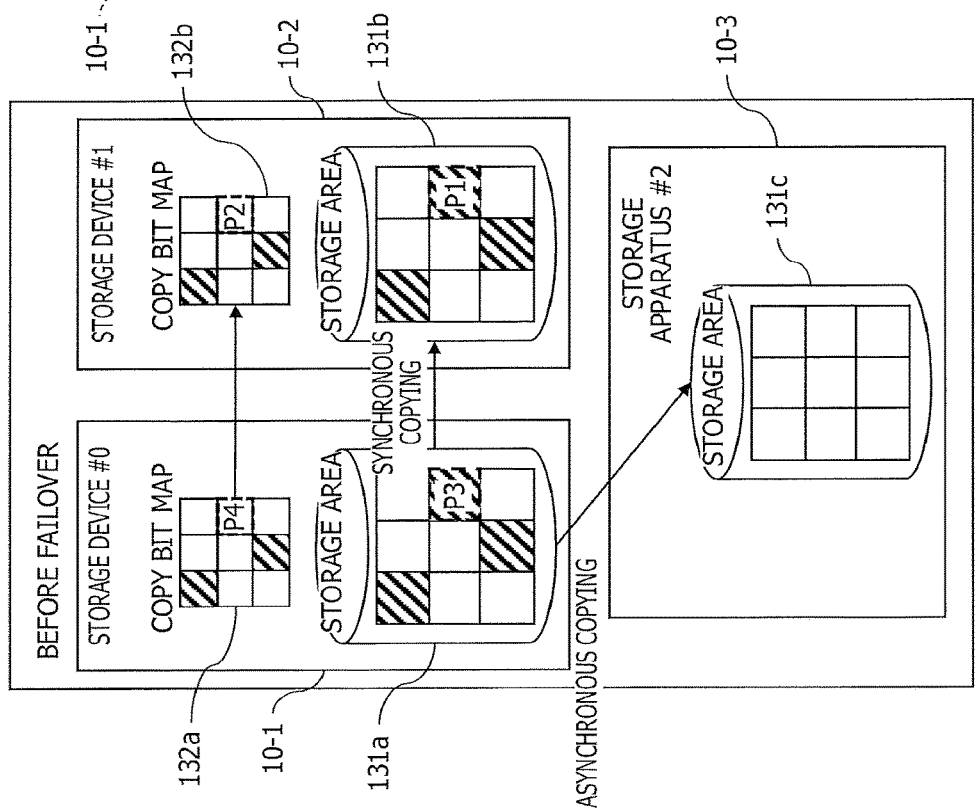
Figure 20:
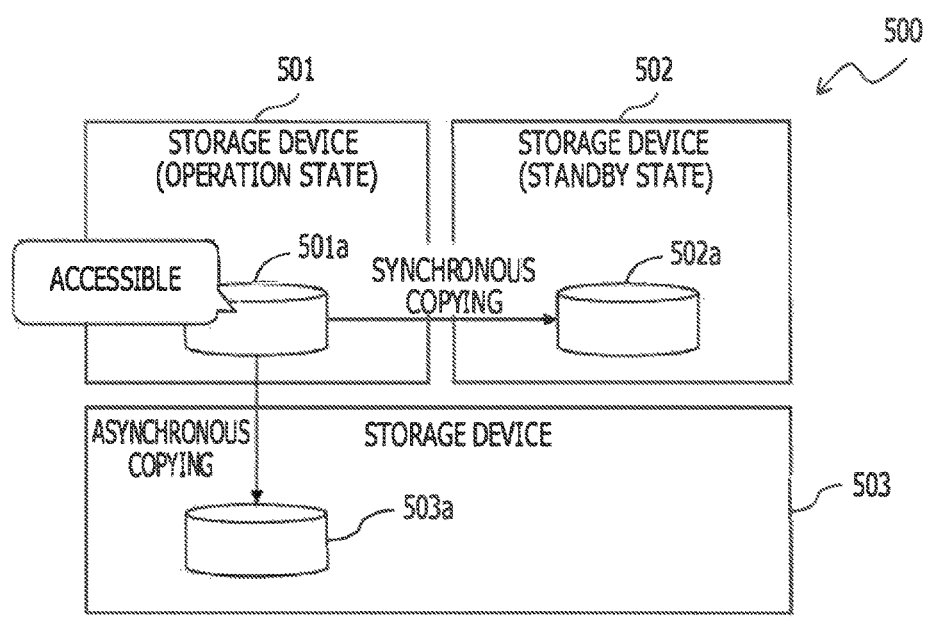
FIG. 20 is a diagram illustrating a configuration of a conventional storage system.

FIGS. 19A and 19B are diagrams illustrating the states of the copy bit map 132 and the storage area 131 before and after the failover in the storage system 1 as the example of the embodiment.

FIG. 19A depicts the state before failover and FIG. 19B illustrates the state after the storage device 10-1 stops and failover to the storage device 10-2 is performed.

In this storage system 1, before failover, the access controller 11 updates the data in the storage area 131 and the copy bit map 132 with the processing steps (1) to (4) described below.

(1) The access controller 11 of the storage device 10-1 transmits update data to the storage device 10-2 to update the storage area 131b (see symbol P1 in FIG. 19A).

(2) The access controller 11 of the storage device 10-1 updates the copy bit map 132b of the storage device 10-2 (see symbol P2 in FIG. 19A).

(3) The access controller 11 of the storage device 10-1 updates the storage area 131a of the storage device 10-1 (see symbol P3 in FIG. 19A).

(4) The access controller 11 of the storage device 10-1 updates the copy bit map 132a of the storage device 10-1 (see symbol P4 in FIG. 19A).

As such, updating of the copy bit map 132b of the storage device 10-2, which is a cluster pair (synchronous copying counterpart) of the storage device 10-1, is performed consecutively after updating of the storage area 131b of the storage device 10-2. More specifically, the updating of the copy bit map 132b of the storage device 10-2 is performed immediately after the updating of the storage area 131b of the storage device 10-2. In addition, even in the storage device 10-1, the updating of the copy bit map 132a is performed immediately after the updating of the storage area 131a of the storage device 10-1.

With this, as illustrated in FIG. 19B, after failover, the copy bit map 132b of the storage device 10-2 promptly enters a state consistent with the data storage state of the storage area 131b. Therefore, the precision of the copy bit map 132b may be improved.

Since the updating of the copy bit map 132b of the storage device 10-2 is performed immediately after the updating of the storage area 131b of the storage device 10-2, it is possible to reduce the potential that a failure occurs in the storage device 10-1 resulting in failover during the period of time from when the updating of the storage area 131a of the storage device 10-1 is performed to when the updating of the copy bit map 132b is performed.

Then, the storage device 10-2 performing remote copying using the copy bit map 132b during failover, the storage device 10-2 may continuously perform, in other words, take over and perform (resume) the remote copying which is suspended due to a failure that occurs in the storage device 10-1. In addition, after failover, performing remote copying with the storage device 10-3 using the highly precise copy bit map 132b which is consistent with the data storage state of the storage area 131b may improve the quality of remote copying and improve the reliability of data of the storage device 10-3.

In addition, even when a failure occurs in the storage device 10-1 which then stops during remote copying from the storage device 10-1 to the storage device 10-3, the storage device 10-2 may continuously perform the remote copying to the storage device 10-3, using the copy bit map 132.

Furthermore, in this storage system 1, the storage device 10-2 has the copy bit map 132b consistent with the copy bit map 132a of the storage device 10-1.

This may enable the storage device 10-2 to continuously perform the remote copying of the storage device 10-1 using the copy bit map 132b, when failover is preformed due to the occurrence of a failure while the storage device 10-1 is performing remote copying to the storage device 10-3.

In addition, the storage device 10-3 may implement remote copying in one storage area 131c, and thus efficiently use the storage area 131c. Furthermore, during failover, rather than having to perform remote copying from the beginning of the copy bit map 132b, the storage device 10-2 may perform remote copying in a short period of time.

As described above, when the writing for a write request from the host device 2 in the storage area 131a and updating of the copy bit map 132a are completed in the storage device 10-1, the writing for the write request from the host device 2 in the storage area 131b and updating of the copy bit map 132b are already completed in the storage device 10-2. Even if failover occurs in the storage device 10-1 at the time when the storage area 131a completes the writing for the write request from the host device 2, no data loss occurs in asynchronous copying to the storage device 10-3 which the storage device 10-2 takes over from the storage device 10-1 and performs.

(E) Other

The disclosed techniques are not limited to the embodiment described above, and may be varied and implemented in various manner as far as the techniques do not depart form the intent of the embodiment. Each configuration and each processing of the embodiment may be selected where appropriate or may be appropriately combined.

In the embodiment described above, for example, the storage system 1 includes the three storage devices 10-1 to 10-3, the embodiment is not limited to this and, for example, the storage system 1 may include more than four storage devices 10.

When the storage device 10 receives a write request from the host device 2 or other storage device 10, more specifically, when the storage device 10 performs a write operation, the storage device 10 may transmit a completion acknowledgment of this write at the timing when the storage device 10 receives the write request and storage of the write data into the cache memory (memory 121) included in the storage device 10 itself is completed. Then, through background processing, the storage device 10 appropriately writes the data to the storage unit 130 allocated to the storage device 10.

In addition, the disclosure described above may enable those in the art to implement and manufacture the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage system, comprising:
 a first storage device including:
  a first memory that stores a plurality of pieces of data;
  a second memory that stores first state information indicating a state of update of the plurality of pieces of data; and
  a first processor coupled to the first memory and the second memory;

a second storage device including:
  a third memory that stores a plurality of pieces of first copied data that is a copy of the plurality of pieces of data;
  a fourth memory that stores second state information indicating a state of update of the plurality of pieces of first copied data; and
  a second processor coupled to the third memory and the fourth memory; and
a third storage device including a fifth memory that stores a plurality of pieces of second copied data that is a copy of the plurality of pieces of data, wherein
the first processor is configured to receive a update request for the plurality of pieces of data stored in the first memory,
the second processor is configured to:
  update a part of the plurality of pieces of first copied data corresponding to the update request, and
  update the second state information in response to an update of the plurality of pieces of first copied data,
the first processor is further configured to:
  update a part of the plurality of pieces of data corresponding to the update request in response to an update of the second state information,
  update the first state information in response to an update of the plurality of pieces of data,
  transmit the plurality of pieces of updated data to the third storage device in response to an update of the first state information, and
  update the first state information in response to a transmission of the plurality of pieces of updated data, and
the second processor is further configured to transmit, when the first storage device stops, the plurality of pieces of updated first copied data to the third storage device, the plurality of pieces of updated first copied data being specified based on the second state information.

2. The storage system according to claim 1, wherein
the first processor is configured to:
  perform a synchronous copying with the second storage device, and
  perform an asynchronous copying with the third storage device, and
the second processor is configured to perform an asynchronous copying with the third storage device when the first storage device stops.

3. A storage device, comprising:
a first memory that stores a plurality of pieces of data;
a second memory that stores first state information indicating a state of update of the plurality of pieces of data; and
a processor coupled to the first memory and the second memory, wherein
the storage device is coupled to a second storage device including:
  a third memory that stores a plurality of pieces of first copied data that is a copy of the plurality of pieces of data, and
  a fourth memory that stores second state information indicating a state of update of the plurality of pieces of first copied data, and
the processor is configured to:
  receive a update request for the plurality of pieces of data stored in the first memory,
  update a part of the plurality of pieces of data corresponding to the update request in response to an update of the plurality of pieces of first copied data corresponding to the update request and an update of the second state information corresponding to the update request,
  update the first state information in response to the update of the plurality of pieces of data,
  transmit the plurality of pieces of updated data to a third storage device in response to the update of the first state information, the third storage device storing a plurality of pieces of second copied data that is a copy of the plurality of pieces of data, and
  update the first state information in response to a transmission of the plurality of pieces of updated data.

4. The storage device according to claim 3, wherein
the processor is configured to:
  perform a synchronous copying with the second storage device, and
  perform an asynchronous copying with the third storage device, and
the second storage device is configured to perform an asynchronous copying with the third storage device when the first storage device stops.

* * * * *